United States Patent
Rico Alvarino et al.

(10) Patent No.: US 12,213,189 B2
(45) Date of Patent: Jan. 28, 2025

(54) OPERATION IN AERIAL DEDICATED SPECTRUM

(71) Applicant: QUALCOMM Incorporated, San Diego, CA (US)

(72) Inventors: Alberto Rico Alvarino, San Diego, CA (US); Chiranjib Saha, San Diego, CA (US); Le Liu, Fremont, CA (US); Umesh Phuyal, San Diego, CA (US); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/468,081

(22) Filed: Sep. 7, 2021

(65) Prior Publication Data

US 2022/0104287 A1 Mar. 31, 2022

Related U.S. Application Data

(60) Provisional application No. 63/083,745, filed on Sep. 25, 2020.

(51) Int. Cl.
*H04W 76/10* (2018.01)
*H04W 48/12* (2009.01)
(Continued)

(52) U.S. Cl.
CPC .......... *H04W 76/10* (2018.02); *H04W 48/12* (2013.01); *H04W 56/001* (2013.01); *H04W 72/0453* (2013.01); *H04W 84/06* (2013.01)

(58) Field of Classification Search
CPC . H04W 76/10; H04W 84/06; H04W 72/0453; H04W 56/001; H04W 48/12;
(Continued)

(56) References Cited

U.S. PATENT DOCUMENTS 11,930,545 B2 * 3/2024 Vutukuri ............... H04W 72/23
2020/0288390 A1 9/2020 Wang et al.
(Continued)

FOREIGN PATENT DOCUMENTS

CN 110401929 B * 2/2021
EP 3893537 A1 10/2021
(Continued)

OTHER PUBLICATIONS

International Search Report and Written Opinion—PCT/US2021/049525—ISA/EPO—Mar. 2, 2022.
(Continued)

*Primary Examiner* — Kashif Siddiqui
(74) *Attorney, Agent, or Firm* — Holland & Hart LLP

(57) ABSTRACT

Methods, systems, and devices for wireless communication are described. Generally, the described techniques provide for maximizing the potential of resources dedicated to aerial user equipment (UEs). In one example, a UE may receive signaling indicating that a cell supports communications exclusively with aerial UEs. The signaling may be used to bar non-aerial UEs from accessing the cell and reserve resources for communications with aerial UEs. In another example, a UE may receive signaling identifying one or more frequency bands dedicated to aerial UEs. The UE may then communicate on the one or more frequency bands. In yet another example, a UE may receive signaling indicating a set of aerial access categories supported by a cell. The signaling may be used to reserve resources for high-priority aerial UEs (e.g., aerial UEs used for law enforcement purposes).

31 Claims, 18 Drawing Sheets

(51) Int. Cl.
  *H04W 56/00*      (2009.01)
  *H04W 72/0453*    (2023.01)
  *H04W 84/06*      (2009.01)

(58) Field of Classification Search
  CPC ..... H04W 48/02; H04W 48/10; H04W 48/16;
                      H04W 72/51; H04W 88/02
  See application file for complete search history.

(56)                References Cited

U.S. PATENT DOCUMENTS

2021/0022054 A1*   1/2021   Tsuda .............. H04W 36/00835
2021/0329533 A1*  10/2021   Kim ...................... H04W 48/12
2021/0368426 A1*  11/2021   Wang .................... H04W 48/12
2022/0030478 A1*   1/2022   Shi ....................... H04W 48/12

FOREIGN PATENT DOCUMENTS

WO     WO-2019154061 A1    8/2019
WO     WO-2019193858 A1   10/2019
WO     WO-2020032771 A1    2/2020
WO     WO-2020114276 A1    6/2020

OTHER PUBLICATIONS

Partial International Search Report—PCT/US2021/049525—ISA/
EPO—Dec. 14, 2021.

* cited by examiner

OPERATION IN AERIAL DEDICATED SPECTRUM

CROSS REFERENCE

The present application for patent claims the benefit of U.S. Provisional Patent Application No. 63/083,745 by Rico Alvarino et al., entitled "OPERATION IN AERIAL DEDICATED SPECTRUM," filed Sep. 25, 2020, assigned to the assignee hereof, and expressly incorporated by reference herein.

FIELD OF TECHNOLOGY

The following relates to wireless communications, including operation in aerial dedicated spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UEs). In some wireless communications systems, the UEs may include aerial UEs which may be devices capable of flying or maneuvering through the air. One example of an aerial UE is an unmanned aerial vehicle (UAV), which may also be referred to as a drone. In some cases, it may be appropriate to define a spectrum dedicated to aerial UEs within which the aerial UEs may communicate with one or more cells (e.g., uplink or downlink communications) or communicate with each other (e.g., sidelink communications).

SUMMARY

The described techniques relate to improved methods, systems, devices, and apparatuses that support operation in aerial dedicated spectrum. Generally, the described techniques provide for maximizing the potential of resources dedicated to aerial user equipment (UEs). In one example, a UE may receive signaling indicating that a cell supports communications exclusively with aerial UEs. The signaling may be used to bar non-aerial UEs from accessing the cell and reserve resources for communications with aerial UEs. In another example, a UE may receive signaling identifying one or more frequency bands and/or cells dedicated to aerial UEs. The UE may then communicate on the one or more frequency bands and/or cells. In yet another example, a UE may receive signaling indicating a set of aerial access categories supported by a cell. The signaling may be used to reserve resources for high-priority aerial UEs (e.g., aerial UEs used for law enforcement purposes).

A method of wireless communication at an aerial UE is described. The method may include receiving a signal or a channel from a cell, determining that the cell supports communications exclusively with aerial UEs based on the signal or the channel, establishing a connection with the cell based on the determining, and communicating with the cell over the established connection.

An apparatus for wireless communication at an aerial UE is described. The apparatus may include a processor, memory coupled with the processor, and instructions stored in the memory. The instructions may be executable by the processor to cause the apparatus to receive a signal or a channel from a cell, determine that the cell supports communications exclusively with aerial UEs based on the signal or the channel, establish a connection with the cell based on the determining, and communicate with the cell over the established connection.

Another apparatus for wireless communication at an aerial UE is described. The apparatus may include means for receiving a signal or a channel from a cell, determining that the cell supports communications exclusively with aerial UEs based on the signal or the channel, establishing a connection with the cell based on the determining, and communicating with the cell over the established connection.

A non-transitory computer-readable medium storing code for wireless communication at an aerial UE is described. The code may include instructions executable by a processor to receive a signal or a channel from a cell, determine that the cell supports communications exclusively with aerial UEs based on the signal or the channel, establish a connection with the cell based on the determining, and communicate with the cell over the established connection.

In some examples of the method, apparatuses, and non-transitory computer-readable medium described herein, determining that the cell supports communications exclusively with aerial UEs based on the signal or the channel may include operations, features, means, or instructions for determining that the cell supports communications exclusively with aerial UEs based on the signal or the channel including a primary synchronization sequence (PSS) reserved for cells supporting communications exclusively with aerial UEs or a secondary synchronization sequence (SSS) reserved for cells supporting communications exclusively with aerial UEs.

In some examples of the method, apparatuses, and non-transitory computer-readable medium described herein, determining that the cell supports communications exclusively with aerial UEs based on the signal or the channel may include operations, features, means, or instructions for determining that the cell supports communications exclusively with aerial UEs based on the signal or the channel including a master information block (MIB) reserved for cells supporting communications exclusively with aerial UEs.

In some examples of the method, apparatuses, and non-transitory computer-readable medium described herein, determining that the cell supports communications exclusively with aerial UEs based on the signal or the channel may include operations, features, means, or instructions for determining that the cell supports communications exclusively with aerial UEs based on the signal or the channel including a physical broadcast channel (PBCH) scrambling sequence reserved for cells supporting communications exclusively with aerial UEs or a demodulation reference signal (DMRS) PBCH sequence reserved for cells supporting communications exclusively with aerial UEs.

In some examples of the method, apparatuses, and non-transitory computer-readable medium described herein, determining that the cell supports communications exclusively with aerial UEs based on the signal or the channel may include operations, features, means, or instructions for determining that the cell supports communications exclusively with aerial UEs based on receiving the signal or the channel on a raster frequency reserved for cells supporting communications exclusively with aerial UEs.

In some examples of the method, apparatuses, and non-transitory computer-readable medium described herein, determining that the cell supports communications exclusively with aerial UEs based on the signal or the channel may include operations, features, means, or instructions for determining that a first barring flag for all UEs in the signal or the channel may be set to a first value indicating that all UEs may be barred from connecting to the cell, and determining that a second barring flag for aerial UEs in the signal or the channel may be set to a second value indicating that aerial UEs may be allowed to connect to the cell.

Some examples of the method, apparatuses, and non-transitory computer-readable medium described herein may further include operations, features, means, or instructions for receiving, in the signal or the channel, a set of aerial access categories supported by the cell, and determining that an aerial access category of the aerial UE may be within the set of aerial access categories supported by the cell, where the establishing the connection may be further based on determining that the aerial access category of the aerial UE may be within the set of aerial access categories supported by the cell.

Some examples of the method, apparatuses, and non-transitory computer-readable medium described herein may further include operations, features, means, or instructions for determining a mission status of the aerial UE, and identifying a mapping of the mission status of the aerial UE to the aerial access category of the UE, where determining that the aerial access category of the UE may be within the set of aerial access categories supported by the cell may be based on identifying the mapping.

A method of wireless communication at a cell is described. The method may include transmitting, to one or more UEs, a signal or a channel indicating that the cell supports communications exclusively with aerial UEs, establishing a connection with at least one aerial UE based on transmitting the signal or the channel, and communicating with the at least one aerial UE over the established connection.

An apparatus for wireless communication at a cell is described. The apparatus may include a processor, memory coupled with the processor, and instructions stored in the memory. The instructions may be executable by the processor to cause the apparatus to transmit, to one or more UEs, a signal or a channel indicating that the cell supports communications exclusively with aerial UEs, establish a connection with at least one aerial UE based on transmitting the signal or the channel, and communicate with the at least one aerial UE over the established connection.

Another apparatus for wireless communication at a cell is described. The apparatus may include means for transmitting, to one or more UEs, a signal or a channel indicating that the cell supports communications exclusively with aerial UEs, establishing a connection with at least one aerial UE based on transmitting the signal or the channel, and communicating with the at least one aerial UE over the established connection.

A non-transitory computer-readable medium storing code for wireless communication at a cell is described. The code may include instructions executable by a processor to transmit, to one or more UEs, a signal or a channel indicating that the cell supports communications exclusively with aerial UEs, establish a connection with at least one aerial UE based on transmitting the signal or the channel, and communicate with the at least one aerial UE over the established connection.

In some examples of the method, apparatuses, and non-transitory computer-readable medium described herein, transmitting the signal or the channel indicating that the cell supports communications exclusively with aerial UEs may include operations, features, means, or instructions for transmitting the signal or the channel with a PSS reserved for cells supporting communications exclusively with aerial UEs or a SSS reserved for cells supporting communications exclusively with aerial UEs.

In some examples of the method, apparatuses, and non-transitory computer-readable medium described herein, transmitting the signal or the channel indicating that the cell supports communications exclusively with aerial UEs may include operations, features, means, or instructions for transmitting the signal or the channel with a MIB reserved for cells supporting communications exclusively with aerial UEs.

In some examples of the method, apparatuses, and non-transitory computer-readable medium described herein, transmitting the signal or the channel indicating that the cell supports communications exclusively with aerial UEs may include operations, features, means, or instructions for transmitting the signal or the channel with a PBCH scrambling sequence reserved for cells supporting communications exclusively with aerial UEs or a DMRS PBCH sequence reserved for cells supporting communications exclusively with aerial UEs.

In some examples of the method, apparatuses, and non-transitory computer-readable medium described herein, transmitting the signal or the channel indicating that the cell supports communications exclusively with aerial UEs may include operations, features, means, or instructions for transmitting the signal or the channel on a raster frequency reserved for cells supporting communications exclusively with aerial UEs.

In some examples of the method, apparatuses, and non-transitory computer-readable medium described herein, transmitting the signal or the channel indicating that the cell supports communications exclusively with aerial UEs may include operations, features, means, or instructions for setting a first barring flag for all UEs in the signal or the channel to a first value indicating that all UEs may be barred from connecting to the cell, and setting a second barring flag for aerial UEs in the signal or the channel to a second value indicating that aerial UEs may be allowed to connect to the cell.

Some examples of the method, apparatuses, and non-transitory computer-readable medium described herein may further include operations, features, means, or instructions for transmitting, in the signal or the channel, a set of aerial access categories supported by the cell, and determining that an aerial access category of the at least one aerial UE may be within the set of aerial access categories supported by the cell, where the establishing the connection may be further based on determining that the aerial access category of the at least one aerial UE may be within the set of aerial access categories supported by the cell.

A method of wireless communication at a first aerial UE is described. The method may include communicating on a first frequency band allocated to aerial UEs and non-aerial UEs, receiving system information identifying a second frequency band dedicated to aerial UEs, and communicating on the second frequency band based on the second frequency band being dedicated to aerial UEs.

An apparatus for wireless communication at a first aerial UE is described. The apparatus may include a processor, memory coupled with the processor, and instructions stored in the memory. The instructions may be executable by the processor to cause the apparatus to communicate on a first frequency band allocated to aerial UEs and non-aerial UEs, receive system information identifying a second frequency band dedicated to aerial UEs, and communicate on the second frequency band based on the second frequency band being dedicated to aerial UEs.

Another apparatus for wireless communication at a first aerial UE is described. The apparatus may include means for communicating on a first frequency band allocated to aerial UEs and non-aerial UEs, receiving system information identifying a second frequency band dedicated to aerial UEs, and communicating on the second frequency band based on the second frequency band being dedicated to aerial UEs.

A non-transitory computer-readable medium storing code for wireless communication at a first aerial UE is described. The code may include instructions executable by a processor to communicate on a first frequency band allocated to aerial UEs and non-aerial UEs, receive system information identifying a second frequency band dedicated to aerial UEs, and communicate on the second frequency band based on the second frequency band being dedicated to aerial UEs.

In some examples of the method, apparatuses, and non-transitory computer-readable medium described herein, receiving system information identifying the second frequency band may include operations, features, means, or instructions for receiving a list of frequency bands in the system information including frequency bands allocated to aerial UEs and non-aerial UEs and frequency bands dedicated to aerial UEs, where the frequency bands dedicated to aerial UEs include the second frequency band.

Some examples of the method, apparatuses, and non-transitory computer-readable medium described herein may further include operations, features, means, or instructions for receiving an indication with each frequency band in the list of frequency bands indicating whether the frequency band may be allocated to aerial UEs and non-aerial UEs or dedicated to aerial UEs. In some examples of the method, apparatuses, and non-transitory computer-readable medium described herein, the list of frequency bands includes an inter-frequency carrier list or a sidelink frequency information list.

In some examples of the method, apparatuses, and non-transitory computer-readable medium described herein, receiving system information identifying the second frequency band may include operations, features, means, or instructions for receiving the system information including a first list of frequency bands allocated to aerial UEs and non-aerial UEs and a second list of frequency bands dedicated to aerial UEs, where the second list of frequency bands includes the second frequency band. In some examples of the method, apparatuses, and non-transitory computer-readable medium described herein, the first list of frequency bands includes an inter-frequency carrier list or a sidelink frequency information list, and the second list of frequency bands includes an inter-frequency carrier list for aerial UEs or a sidelink frequency information list for aerial UEs.

Some examples of the method, apparatuses, and non-transitory computer-readable medium described herein may further include operations, features, means, or instructions for selecting a cell supporting communications on the second frequency band, and establishing a connection with the selected cell. In some examples of the method, apparatuses, and non-transitory computer-readable medium described herein, the system information further identifies the cell supporting communications on the second frequency band with which the aerial UE may be to establish the connection.

A method of wireless communication at a base station is described. The method may include communicating with an aerial UE on a first frequency band allocated to aerial UEs and non-aerial UEs, identifying a second frequency band dedicated to aerial UEs, and transmitting system information identifying the second frequency band dedicated to aerial UEs.

An apparatus for wireless communication at a base station is described. The apparatus may include a processor, memory coupled with the processor, and instructions stored in the memory. The instructions may be executable by the processor to cause the apparatus to communicate with an aerial UE on a first frequency band allocated to aerial UEs and non-aerial UEs, identify a second frequency band dedicated to aerial UEs, and transmit system information identifying the second frequency band dedicated to aerial UEs.

Another apparatus for wireless communication at a base station is described. The apparatus may include means for communicating with an aerial UE on a first frequency band allocated to aerial UEs and non-aerial UEs, identifying a second frequency band dedicated to aerial UEs, and transmitting system information identifying the second frequency band dedicated to aerial UEs.

A non-transitory computer-readable medium storing code for wireless communication at a base station is described. The code may include instructions executable by a processor to communicate with an aerial UE on a first frequency band allocated to aerial UEs and non-aerial UEs, identify a second frequency band dedicated to aerial UEs, and transmit system information identifying the second frequency band dedicated to aerial UEs.

In some examples of the method, apparatuses, and non-transitory computer-readable medium described herein, transmitting system information identifying the second frequency band may include operations, features, means, or instructions for transmitting a list of frequency bands in the system information including frequency bands allocated to aerial UEs and non-aerial UEs and frequency bands dedicated to aerial UEs, where the frequency bands dedicated to aerial UEs include the second frequency band.

Some examples of the method, apparatuses, and non-transitory computer-readable medium described herein may further include operations, features, means, or instructions for transmitting an indication with each frequency band in the list of frequency bands indicating whether the frequency band may be allocated to aerial UEs and non-aerial UEs or dedicated to aerial UEs. In some examples of the method, apparatuses, and non-transitory computer-readable medium described herein, the list of frequency bands includes an inter-frequency carrier list or a sidelink frequency information list.

In some examples of the method, apparatuses, and non-transitory computer-readable medium described herein, transmitting system information identifying the second frequency band may include operations, features, means, or instructions for transmitting the system information including a first list of frequency bands allocated to aerial UEs and non-aerial UEs and a second list of frequency bands dedicated to aerial UEs, where the second list of frequency bands includes the second frequency band.

In some examples of the method, apparatuses, and non-transitory computer-readable medium described herein, the first list of frequency bands includes an inter-frequency carrier list or a sidelink frequency information list, and the second list of frequency bands includes an inter-frequency carrier list for aerial UEs or a sidelink frequency information list for aerial UEs. In some examples of the method, apparatuses, and non-transitory computer-readable medium described herein, the system information further identifies a cell with which the aerial UE may be to establish a connection for communications on the second frequency band.

DETAILED DESCRIPTION

Some wireless communications systems may support aerial user equipment (UEs) which may be devices capable of flying or maneuvering through the air. In such systems, it may be appropriate to define a spectrum dedicated to aerial UEs within which the aerial UEs may communicate. The dedicated spectrum may be for uplink and downlink communications between aerial UEs and one or more cells (e.g., over a Uu interface), or the dedicated spectrum may be for sidelink communications between aerial UEs (e.g., over a PC5 interface). The uplink and downlink communications may support different applications such as video, remote command and control (C2), etc., and the sidelink communications may also support different applications such as collision control, remote identification, remote control, etc.

In some cases, if a dedicated spectrum is assigned to aerial UEs, it may be challenging to maximize the potential of the dedicated spectrum. For instance, it may be challenging to prevent non-aerial UEs from camping on cells dedicated to aerial UEs, and it may also be challenging for aerial UEs to identify cells dedicated to these UEs.

As described herein, a wireless communications system may support efficient techniques for maximizing the potential of resources dedicated to aerial UEs. In one example, a UE may receive signaling indicating that a cell supports communications exclusively with aerial UEs. The signaling may be used to bar non-aerial UEs from accessing the cell and reserve resources for communications with aerial UEs. In another example, a UE may receive signaling identifying one or more frequency bands dedicated to aerial UEs. The UE may then communicate on the one or more frequency bands. In yet another example, a UE may receive signaling indicating a set of aerial access categories supported by a cell. The signaling may be used to reserve resources for high-priority aerial UEs (e.g., aerial UEs used for law enforcement purposes).

Aspects of the disclosure introduced above are described below in the context of a wireless communications system. Examples of processes and signaling exchanges that support operation in aerial dedicated spectrum are then described. Aspects of the disclosure are further illustrated by and described with reference to apparatus diagrams, system diagrams, and flowcharts that relate to operation in aerial dedicated spectrum.

Figure 1:
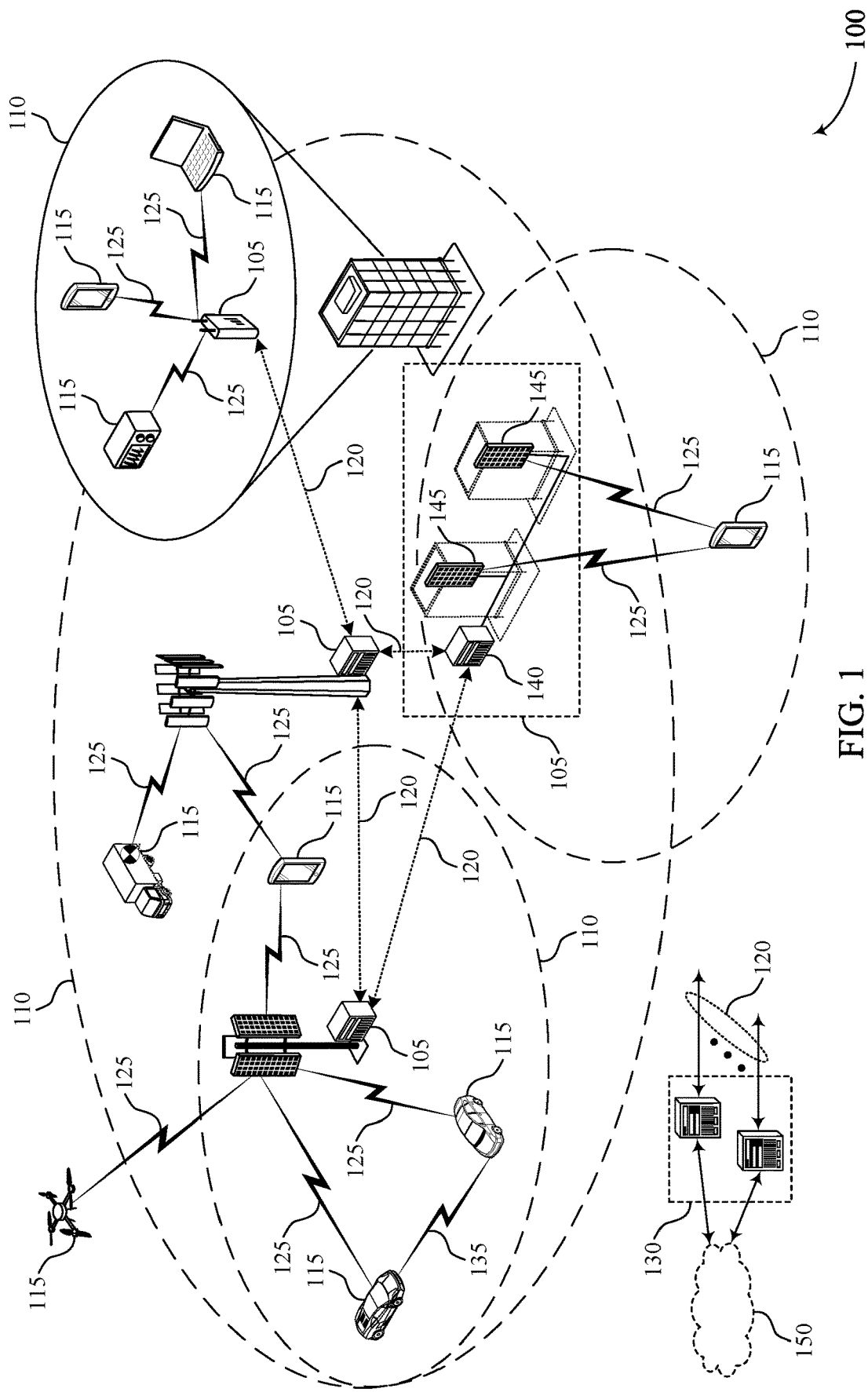
FIG. 1 illustrates an example of a wireless communications system that supports operation in aerial dedicated spectrum in accordance with aspects of the present disclosure.

FIG. 1 illustrates an example of a wireless communications system 100 that supports operation in aerial dedicated spectrum in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a sidelink or device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some UEs 115 in wireless communications system 100 may be aerial UEs 115 capable of flying or maneuvering through the air. Such aerial UEs 115 may support uplink or downlink communications with one or more cells or sidelink communications with each other. The wireless communications system 100 may support efficient techniques for maximizing the potential of resources dedicated to aerial UEs 115. In one example, a UE 115 may receive signaling indicating that a cell associated with a base station 105 supports communications exclusively with aerial UEs 115. The signaling may be used to bar non-aerial UEs 115 from accessing the cell and reserve resources for communications with aerial UEs 115. In another example, a UE 115 may receive signaling identifying one or more frequency bands and/or cells dedicated to aerial UEs 115. The UE 115 may then communicate on the one or more frequency bands and/or cells if it is an aerial UE 115. In yet another example, a UE 115 may receive signaling indicating a set of aerial access categories supported by a cell associated with a base station 105. The signaling may be used to reserve resources for high-priority aerial UEs 115 (e.g., aerial UEs 115 used for law enforcement purposes).

Figure 2:
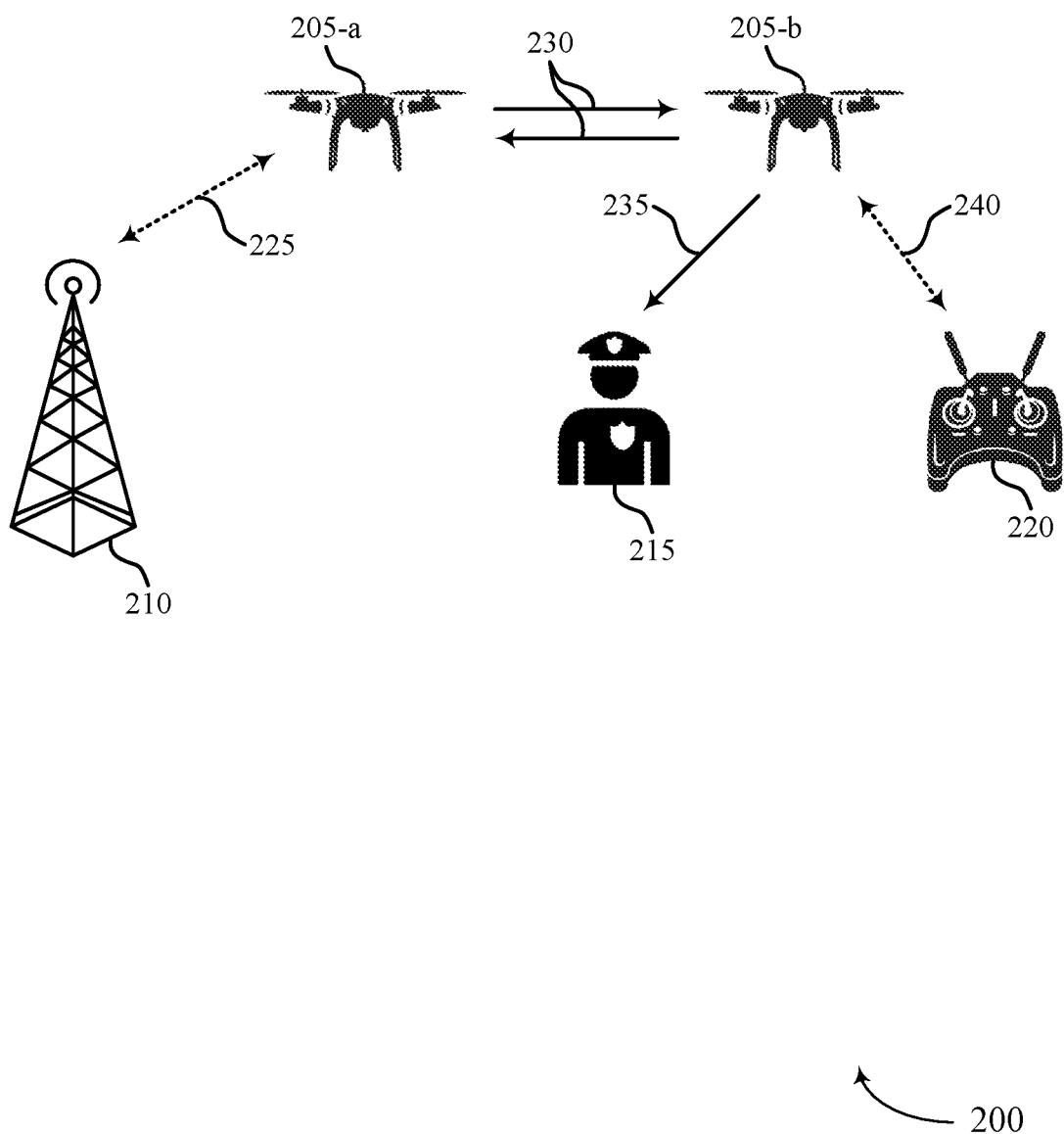
FIG. 2 illustrates an example of radio aspects of aerial user equipment (UE) communications in accordance with aspects of the present disclosure.

FIG. 2 illustrates an example of radio aspects 200 of aerial UE communications in accordance with aspects of the present disclosure. In the example of FIG. 2, an aerial UE 205-a may establish a connection 225 (e.g., Uu connectivity) with a cell 210, and the aerial UE 205-a may communicate with the cell 210 to support different applications (e.g., video, remote C2, etc.). In some cases, some aspects of uplink or downlink communications already in LTE may be ported to NR with potentially some new aspects. The aerial UE 205-a may also establish a connection 230 (e.g., PC5 connection) with another aerial UE 205-b, and the aerial UE 205-a may communicate with the aerial UE 205-b to support other applications. Examples of such applications include user-to-everything (U2X) detect and avoid (U2X-DAA) applications and other applications mainly used for collision control (e.g., using broadcast messages). In some examples, the aerial UE 205-b may also interact (e.g., over a connection 235, such as a PC5 connection) with a law enforcement officer 215 or service for identification or other purposes. As an example, the aerial UE 205-b may interact with the law enforcement officer 215 or service for U2X identification (ID) (e.g., remote identification), and the aerial UE 205-b may identify or receive flight information from the law enforcement officer 215 or service (e.g., using broadcast messages). In other examples, the aerial UE 205-b may establish a connection 240 with a remote control 220 for remote command and control (e.g., up to 10 km). The connection 240 may be referred to as a U2X-C2 connection and may be, for example, a PC5, bidirectional connection.

To improve the quality of service experienced by aerial UEs 115, wireless communications system 100 may support a spectrum dedicated to aerial UEs 115 within which only aerial UEs 115 may communicate (e.g., barring non-aerial UEs 115). In some cases, however, it may be challenging to enable technologies (e.g., NR) operating in an aerial dedicated spectrum. In one example, it may be challenging for an aerial UE 115 to identify that a given cell or band is reserved for aerial UEs 115 and prevent other, non-aerial UEs from camping on the cell. In another example, it may be challenging to efficiently move UEs 115 across different bands (e.g., to try to make aerial UEs 115 camp on dedicated aerial bands). In yet another example, it may be challenging to indicate that a given sidelink band is reserved for aerial UEs 115. In yet another example, it may be challenging to implement access control for aerial UEs 115. Wireless communications system 100 may support efficient techniques for overcoming these challenges and maximizing the potential of resources dedicated to aerial UEs 115.

As described above, aerial UEs 115 may be UEs 115 capable of flying or maneuvering through the air. An aerial UE 115, while capable of being in flight, need not be airborne in order to access the resources or cells reserved for aerial UEs 115. For instance, it may be equally important for a drone (e.g., aerial UE 115) on the ground to be able to access the resources or cells reserved for aerial UEs 115. Further, a non-aerial UE 115 may not correspond to an aerial UE 115 that is not currently airborne. Instead, non-aerial UEs 115 may be UEs 115 that are not configured as aerial UEs 115.

In the examples described herein, communications exclusively with aerial UEs 115 may be referred to as aerial communications, and aerial communications may include uplink or downlink communications between aerial UEs 115 and one or more cells (e.g., base stations 105) or sidelink communications between aerial UEs 115. In addition, cells exclusively supporting aerial communications may be referred to as aerial cells. Further, a spectrum, frequency band, carrier, or resource dedicated to aerial UEs 115 may be allocated exclusively for aerial communications and may be referred to as an aerial-only or aerial-UE-only spectrum, frequency band, carrier, or resource.

Figure 3:
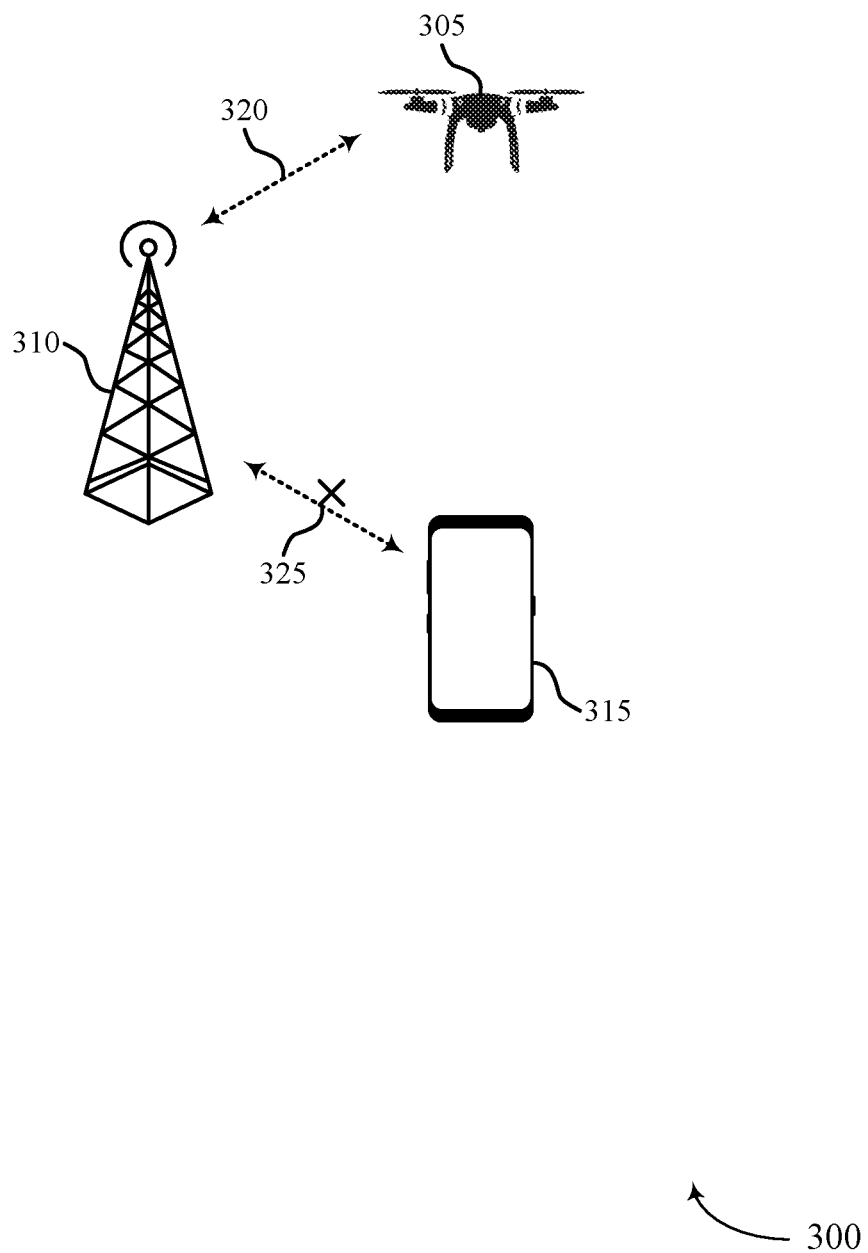
FIGS. 3-6 illustrate examples of wireless communications systems that support operation in aerial dedicated spectrum in accordance with aspects of the present disclosure.

FIG. 3 illustrates an example of a wireless communications system 300 that supports operation in aerial dedicated spectrum in accordance with aspects of the present disclosure. Wireless communications system 300 includes an aerial UE 305, an aerial cell 310, and a non-aerial UE 315. In the example of FIG. 3, wireless communications system 300 may indicate that the cell 310 is for aerial UE use only to prevent non-aerial UEs from camping on the cell 310. Thus, aerial UE 305 may be able to establish a connection 320 with the cell 310, but non-aerial UE 315 may be unable to establish a connection 325 with the cell 310. Although older UEs 115 may not be able to understand an indication transmitted by the cell 310 indicating that the cell 310 is for aerial UE use only, the techniques described herein may prevent these older UEs 115 from camping on the cell 310.

In some aspects, wireless communications system 300 may introduce a change in a synchronization signal block (SSB) transmitted by the cell 310 to indicate that the cell 310 is used only for aerial communications. The SSB may be an example of a signal or a channel and may include a primary synchronization signal (PSS), secondary synchronization signal (SSS), a master information block (MIB), a physical broadcast channel (PBCH), and demodulation reference signals (DMRSs) transmitted with the PBCH (DMRS PBCH).

In one example, the cell 310 may modify a PSS sequence or SSS sequence in an SSB or relative placement (e.g., position) of the PSS and SSS in a time domain in the SSB to indicate that the cell 310 supports communications exclusively with aerial UEs 115 (e.g., uplink, downlink, or sidelink communications with aerial UEs 115). For instance, the cell 310 may transmit an SSB with a PSS sequence or SSS sequence reserved for cells supporting communications exclusively with aerial UEs, and the aerial UE 305 may determine that the cell 310 supports communications exclusively with aerial UEs based on the PSS sequence or SSS sequence in the SSB. Additionally, or alternatively, the cell 310 may transmit an SSB with a PSS sequence or SSS sequence such that a placement of the PSS sequence or SSS sequence in a time domain in the SSB indicates that the cell 310 supports communications exclusively with aerial UEs. The aerial UE 305 may then determine that the cell supports communications exclusively with aerial UEs based on the placement of the PSS sequence or SSS sequence in a time domain in the SSB.

Because only aerial UEs 115 may be configured to decode an SSB with a PSS sequence or SSS sequence reserved for cells supporting communications exclusively with aerial UEs, non-aerial UEs 115 may not be able to access the cell 310. Similarly, because only aerial UEs 115 may be configured to decode an SSB with a PSS sequence or SSS sequence placed in a predetermined location in the time domain reserved for cells supporting communications exclusively with aerial UEs, non-aerial UEs 115 may not be able to access the cell 310.

In another example, the cell 310 may use a different master information block (MIB) in an SSB to indicate that the cell 310 supports communications exclusively with aerial UEs 115. For instance, the cell 310 may transmit an SSB with a MIB reserved for cells supporting communications exclusively with aerial UEs, and the aerial UE 305 may determine that the cell 310 supports communications exclusively with aerial UEs based on the MIB in the SSB. As an example, the cell 310 may use an extension in a broadcast control channel (BCCH) indicating that the cell 310 supports communications exclusively with aerial UEs 115. For instance, a messageClassExtension is shown below:

```
BCCH-BCH-MessageType :: = CHOICE {
    mib MIB,
    messageClassExtension SEQUENCE { }
}
```

Because only aerial UEs 115 may be configured to decode a MIB reserved for cells supporting communications exclusively with aerial UEs 115, non-aerial UEs 115 may not be able to access the cell 310.

In yet another example, the cell 310 may use a different PBCH scrambling or DMRS PBCH sequence in an SSB to indicate that the cell 310 supports communications exclusively with aerial UEs 115. For instance, the cell 310 may transmit an SSB with a PBCH scrambling sequence or DMRS PBCH sequence reserved for cells supporting communications exclusively with aerial UEs, and the aerial UE 305 may determine that the cell 310 supports communications exclusively with aerial UEs based on the PBCH scrambling sequence or DMRS PBCH sequence in the SSB. Because only aerial UEs 115 may be configured to decode an SSB with a PBCH scrambling sequence or a DMRS PBCH sequence reserved for cells supporting communications exclusively with aerial UEs, non-aerial UEs 115 may not be able to access the cell 310.

In yet another example, the cell 310 may use a different raster frequency for an SSB to indicate that the cell 310 supports communications exclusively with aerial UEs 115. For instance, the cell 310 may transmit an SSB at a raster frequency reserved for cells supporting communications exclusively with aerial UEs, and the aerial UE 305 may determine that the cell 310 supports communications exclusively with aerial UEs based on the raster frequency at which the SSB is received. Because only aerial UEs 115 may be configured to receive and decode an SSB at a raster frequency reserved for cells supporting communications exclusively with aerial UEs, non-aerial UEs 115 may not be able to access the cell 310.

In the examples described above, the technique of modifying the SSB to indicate that the cell 310 is used only for aerial communications may be invisible to older UEs 115. That is, the operations of older UEs 115 may not change even though a change to the SSB may be introduced for aerial cells. Instead, older UEs 115 may simply fail to access aerial cells, because the older UEs may not be able to receive or decode the SSBs transmitted by aerial cells. Thus, these older UEs 115 may be prevented from camping on aerial cells. However, because the SSB transmitted by aerial cells may be modified, upon receiving an SSB, an aerial UE may be configured to hypothesize between aerial cells and other cells to decode the SSB (e.g., for PBCH decoding or PSS/SSS detection). As a result, the complexity at these aerial UEs 115 may increase.

In other aspects, to limit the complexity at aerial UEs 115, the cell 310 may indicate in system information that the cell 310 is used only for aerial communications. In such aspects, the system information may be an example of a signal or a channel. In particular, the system information may include a first barring flag for all UEs 115, and the cell 310 may set the first barring flag to a value indicating that all UEs 115 are barred from connecting to the cell. The system information may also include a second barring flag for aerial UEs 115, and the cell 310 may set the second barring flag to a value indicating that aerial UEs are allowed to connect to the cell. Because the first barring flag may already be included in the system information, older UEs 115 may be able to read and interpret the first barring flag. Thus, non-aerial UEs 115 may receive the first barring flag and determine to avoid attempting to access the cell 310. Although the first barring flag may originally be used to bar all UEs 115 from accessing the cell 310, the second barring flag may override the first barring flag (e.g., for aerial UEs 115), and aerial UEs 115 may use the second barring flag to determine whether to access the cell 310.

Figure 4:
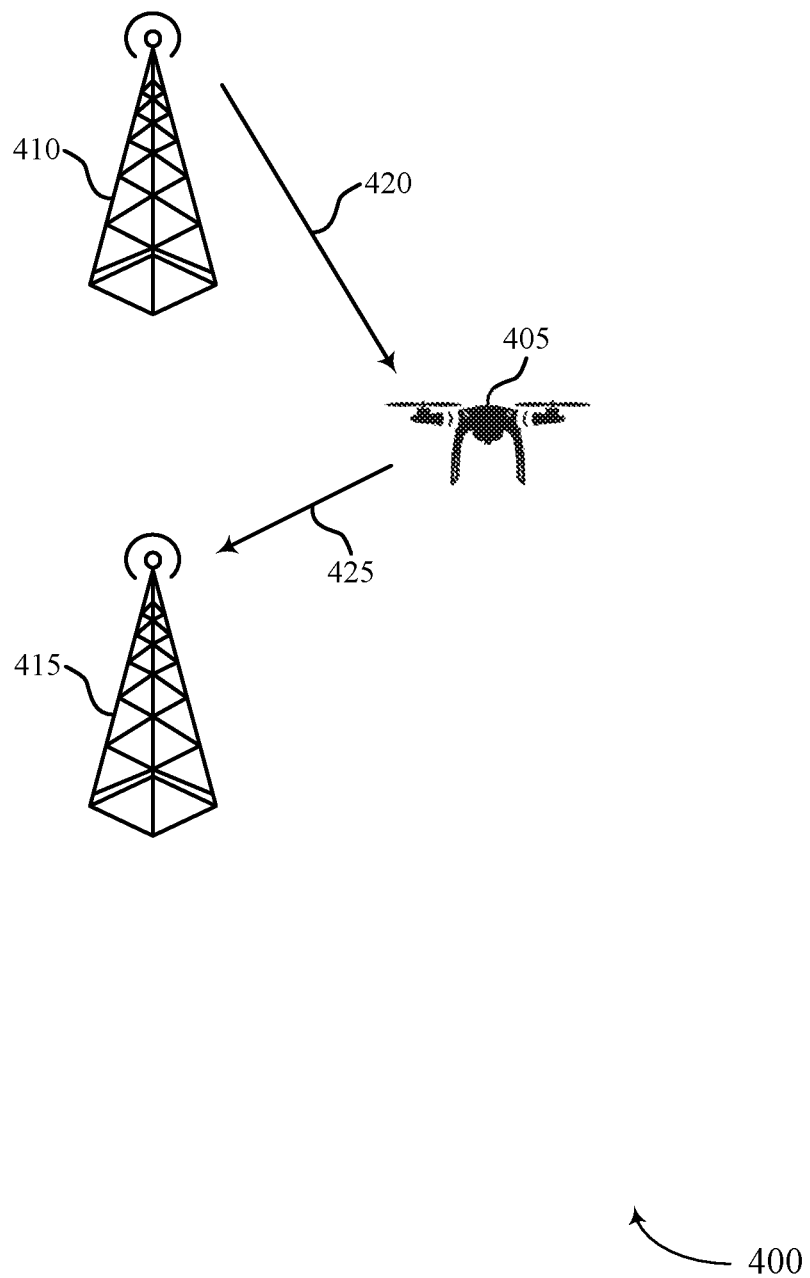

FIG. 4 illustrates an example of a wireless communications system 400 that supports operation in aerial dedicated spectrum in accordance with aspects of the present disclosure. Wireless communications system 400 includes aerial UE 405, non-aerial cell 410, and aerial cell 415. Because aerial cells may not be available everywhere, the aerial UE 405 may originally be connected to the non-aerial cell 410. However, as described herein, it may be beneficial to move the aerial UE 405 to the aerial cell 415 as soon as possible in a given area (e.g., once the aerial UE 405 moves to an area covered by the aerial cell 415). To facilitate the move to the aerial cell 415, the non-aerial cell 410 may be configured to inform the aerial UE 405, over the connection 420, about the existence of aerial cells including the aerial cell 415. The aerial UE 405 may then establish a connection 425 with the aerial cell 415 for subsequent communications.

In some examples, the non-aerial cell 410 may transmit the indication of aerial cells or frequency bands allocated for aerial communications in system information. In particular, the system information may include a set of neighbor cells (or frequencies) in which the aerial UE 405 may find cells, and the non-aerial cell 410 may additionally indicate whether these cells are aerial cells or other cells.

In some aspects, the non-aerial cell 410 may transmit, and the aerial UE 405 may receive, a list of frequency bands (e.g., carriers or carrier frequencies) and/or cells including frequency bands and/or cells allocated to aerial UEs and non-aerial UEs and frequency bands and/or cells dedicated to aerial UEs (e.g., in system information). That is, the non-aerial cell 410 may indicate a single list of frequency bands and/or cells allocated to aerial UEs and non-aerial UEs and frequency bands and/or cells dedicated to aerial UEs. The single list may be referred to as an inter-frequency carrier frequency list (e.g., interFreqCarrierFreqList). In such aspects, the non-aerial cell 410 may also transmit, and the aerial UE 405 may receive, an indication of whether a given frequency band (or carrier frequency) and/or cell is for aerial-only use. Thus, the aerial UE 405 may be able to identify the frequency bands and/or cells dedicated to aerial UEs, and the aerial UE 405 may communicate on at least one of the frequency bands and/or cells dedicated to aerial UEs.

In other aspects, the non-aerial cell 410 may transmit, and the aerial UE 405 may receive, a first list of frequency bands and/or cells allocated to aerial UEs and non-aerial UEs and a second list of frequency bands and/or cells dedicated to aerial UEs. That is, the non-aerial cell 410 may use different lists to differentiate between frequency bands and/or cells allocated to aerial UEs and non-aerial UEs and frequency bands and/or cells dedicated to aerial UEs. Accordingly, the second list may be hidden from older UEs since these older UEs may be incapable of identifying the second list in the system information. The first list may be referred to as an inter-frequency carrier frequency list (e.g., interFreqCarrierFreqList), and the second list may be referred to as an inter-frequency carrier frequency list for aerial UEs (e.g., interFreqCarrierFreqList-UAV). Thus, the aerial UE 405 may be able to identify the frequency bands and/or cells dedicated to aerial UEs, and the aerial UE 405 may communicate on at least one of the frequency bands and/or cells dedicated to aerial UEs.

In some examples, the terms cell and carrier may be used interchangeably since a cell may be configured to communicate on a predetermined carrier. In some cases, however, multiple cells may be configured to communicate on a single carrier, or a single cell may be configured to communicate on multiple carriers. In such cases, rather than only indicating a frequency band, the non-aerial cell 410 may indicate a specific cell (e.g., aerial cell 415) within a frequency band with which the aerial UE 405 is to communicate (e.g., the granularity of the indication of frequency bands on which the aerial UE 405 is to communicate may be smaller).

Figure 5:
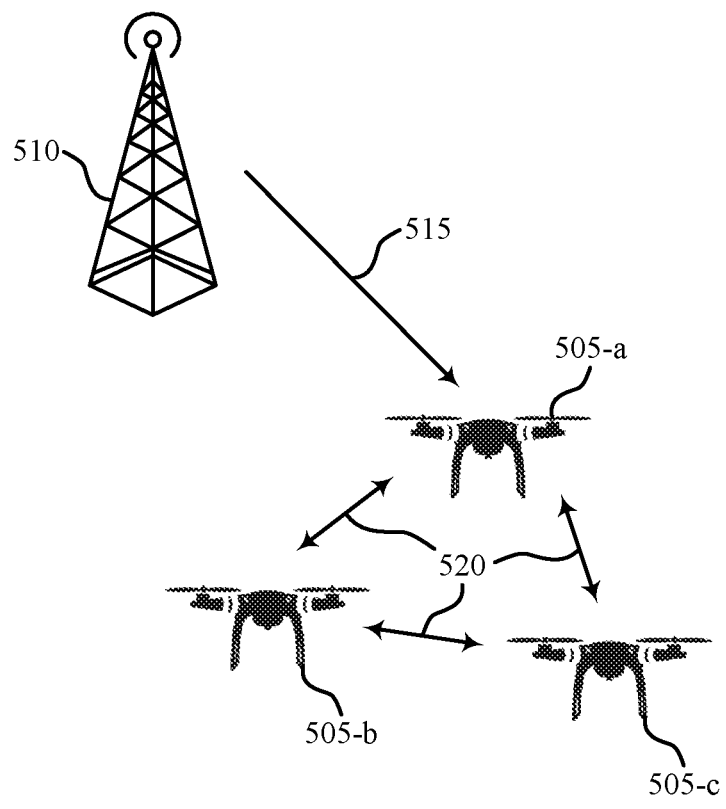

FIG. 5 illustrates an example of a wireless communications system 500 that supports operation in aerial dedicated spectrum in accordance with aspects of the present disclosure. Wireless communications system 500 includes aerial UEs 505-*a*, 505-*b*, and 505-*c* and a cell 510 (e.g., an aerial or non-aerial cell). The aerial UEs 505 may be connected via one or more sidelink (e.g., PC5) connections 520, and the cell 510 may communicate with one or more of the aerial UEs 505 via a connection 515. In order to enable the use of a dedicated sidelink spectrum for communications between aerial UEs 505, the cell 510 may indicate (e.g., in system information, such as a system information block) one or more frequency bands and/or cells allocated exclusively to aerial UEs for aerial communications. The aerial UEs 505 may receive the indication of the one or more frequency bands and/or cells, and the aerial UEs 505 may communicate with each other over the one or more frequency bands and/or cells dedicated to aerial UEs.

In some aspects, the cell 510 may transmit, and an aerial UE 505 may receive, a list of frequency bands and/or cells (e.g., carriers or carrier frequencies) including frequency bands and/or cells allocated to aerial UEs and non-aerial UEs and frequency bands and/or cells dedicated to aerial UEs (e.g., in system information). That is, the cell 510 may indicate a single list of frequency bands and/or cells allocated to aerial UEs and non-aerial UEs and frequency bands and/or cells dedicated to aerial UEs. The single list may be referred to as a sidelink frequency information list (e.g., sl-FreqInfoList). In such aspects, the cell 510 may also transmit, and the aerial UE 505 may receive, an indication of whether a given frequency band (or carrier frequency) and/or cell is for aerial-UE-only use. Thus, the aerial UE 505 may be able to identify the frequency bands and/or cells dedicated to aerial UEs, and the aerial UE 505 may communicate with other aerial UEs 505 on at least one of the frequency bands and/or cells dedicated to aerial UEs.

In other aspects, the cell 510 may transmit, and an aerial UE 505 may receive, a first list of frequency bands and/or cells allocated to aerial UEs and non-aerial UEs and a second list of frequency bands and/or cells dedicated to aerial UEs. That is, the cell 510 may use different lists to differentiate between frequency bands and/or cells allocated to aerial UEs and non-aerial UEs and frequency bands and/or cells dedicated to aerial UEs. Accordingly, the second list may be hidden from older UEs since these older UEs may be incapable of identifying the second list in the system information. The first list may be referred to as a sidelink frequency list (e.g., sl-FreqInfoList), and the second list may be referred to as a sidelink frequency list for aerial UEs (e.g., sl-FreqInfoList-UAV). Thus, the aerial UE 505 may be able to identify the frequency bands and/or cells dedicated to aerial UEs, and the aerial UE 505 may communicate with other aerial UEs 505 on at least one of the frequency bands and/or cells dedicated to aerial UEs.

Figure 6:
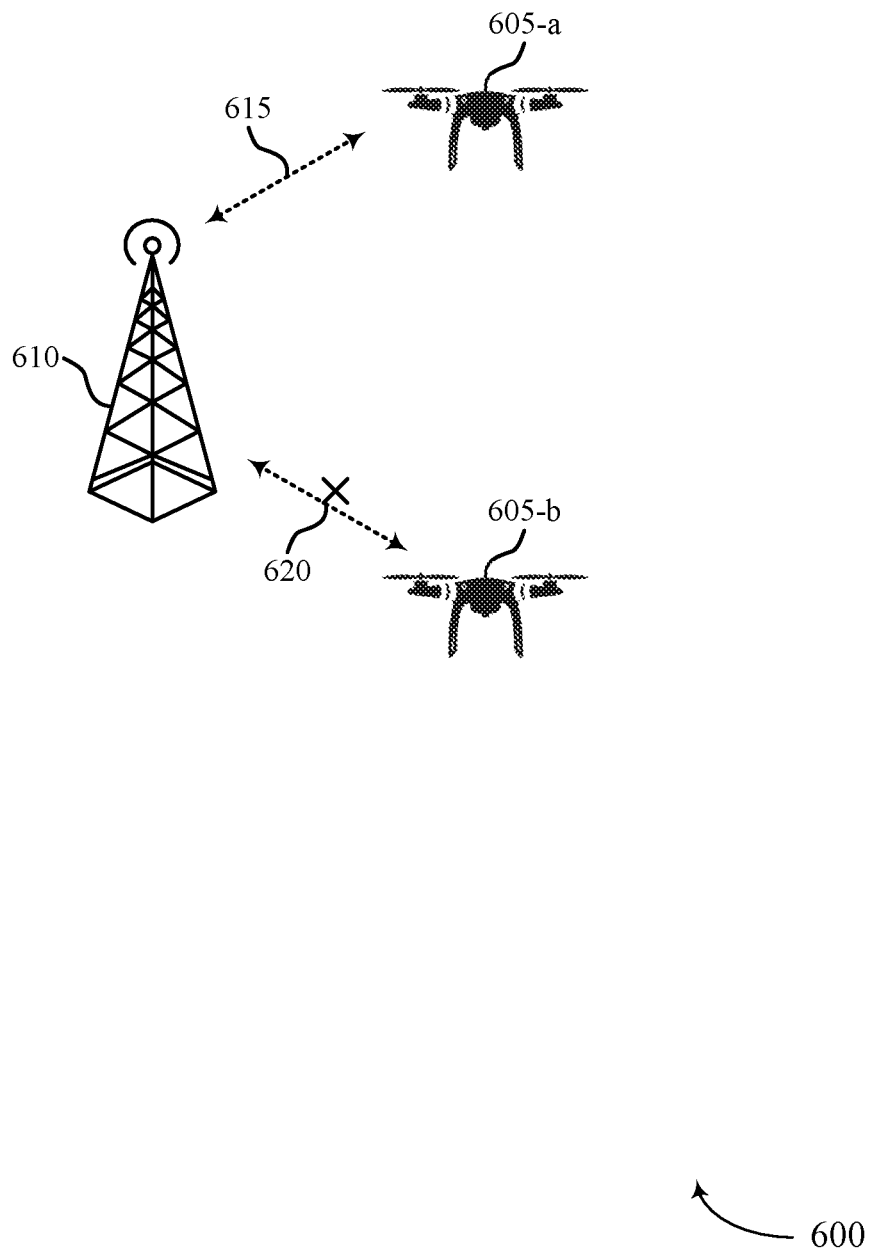

FIG. 6 illustrates an example of a wireless communications system 600 that supports operation in aerial dedicated spectrum in accordance with aspects of the present disclosure. Wireless communications system 600 includes aerial UEs 605-*a* and 605-*b* and a cell 610 (e.g., an aerial or non-aerial cell) and may support an access control mechanism for aerial UEs. As part of the access control mechanism, the cell 610 may indicate in system information the aerial access categories (or mission statuses) that can access a cell at a given point in time. For instance, the cell 610 may transmit, and each aerial UE 605 may receive, a set of aerial access categories supported by the cell 610. The aerial UE 605-*a* may determine that an aerial access category of the aerial UE 605-*a* is within the set of aerial access categories supported by the cell 610, and the aerial UE 605-*a* may establish a connection 615 with the cell 610. Alternatively, the aerial UE 605-*b* may determine that an aerial access category of the aerial UE 605-*b* is not within the set of aerial access categories supported by the cell 610, and the aerial UE 605-*b* may fail to establish (or avoid establishing) a connection 620 with the cell 610.

Using the access control mechanism described above, the cell 610 may bar certain aerial UEs from accessing the cell 610. In one example, in an emergency, an aerial-UE-only band may be reserved for public safety use (e.g., for police), and it may be appropriate for a non-emergency aerial UE to move to a different cell. In another example, the set of aerial access categories supported by the cell 610 may include an access category for aerial-critical mission. In some cases, an aerial access category of an aerial UE may depend on the state of the aerial UE (e.g., whether the aerial UE is flying or on the ground). In such cases, the aerial UE may be on the ground and active (e.g., a surveillance drone), so the state of the aerial UE may be "active drone" instead of "flying drone." Further, the aerial UE may support other, additional states (e.g., a ready to takeoff state, ready to land state, etc.). The aerial access categories described above may be separate from another (e.g., an older) set of access categories supported by the cell 610 (e.g., denominated aerial access categories).

In some aspects, there may be an N:1 mapping between "Mission status" and "radio category for access." In such aspects, an aerial UE 605 may determine a mission status of the aerial UE 605, and the aerial UE 605 may identify a mapping of the mission status of the aerial UE 605 to an aerial access category. The aerial UE 605 may then determine whether the aerial access category is within a set of aerial access categories supported by the cell 610. Alternatively, the aerial UE 605 may determine whether the mission status of the aerial UE 605 is within a set of mission statuses supported by the cell 610. If the aerial UE 605 determines that the aerial access category of the aerial UE 605 is within a set of aerial access categories supported by the cell 610, or the aerial UE 605 determines that the mission status of the aerial UE 605 is within a set of mission statuses supported by the cell 610, the aerial UE 605 may establish a connection with the cell 610. Otherwise, the aerial UE 605 may avoid establishing a connection with the cell 610.

Figure 7:
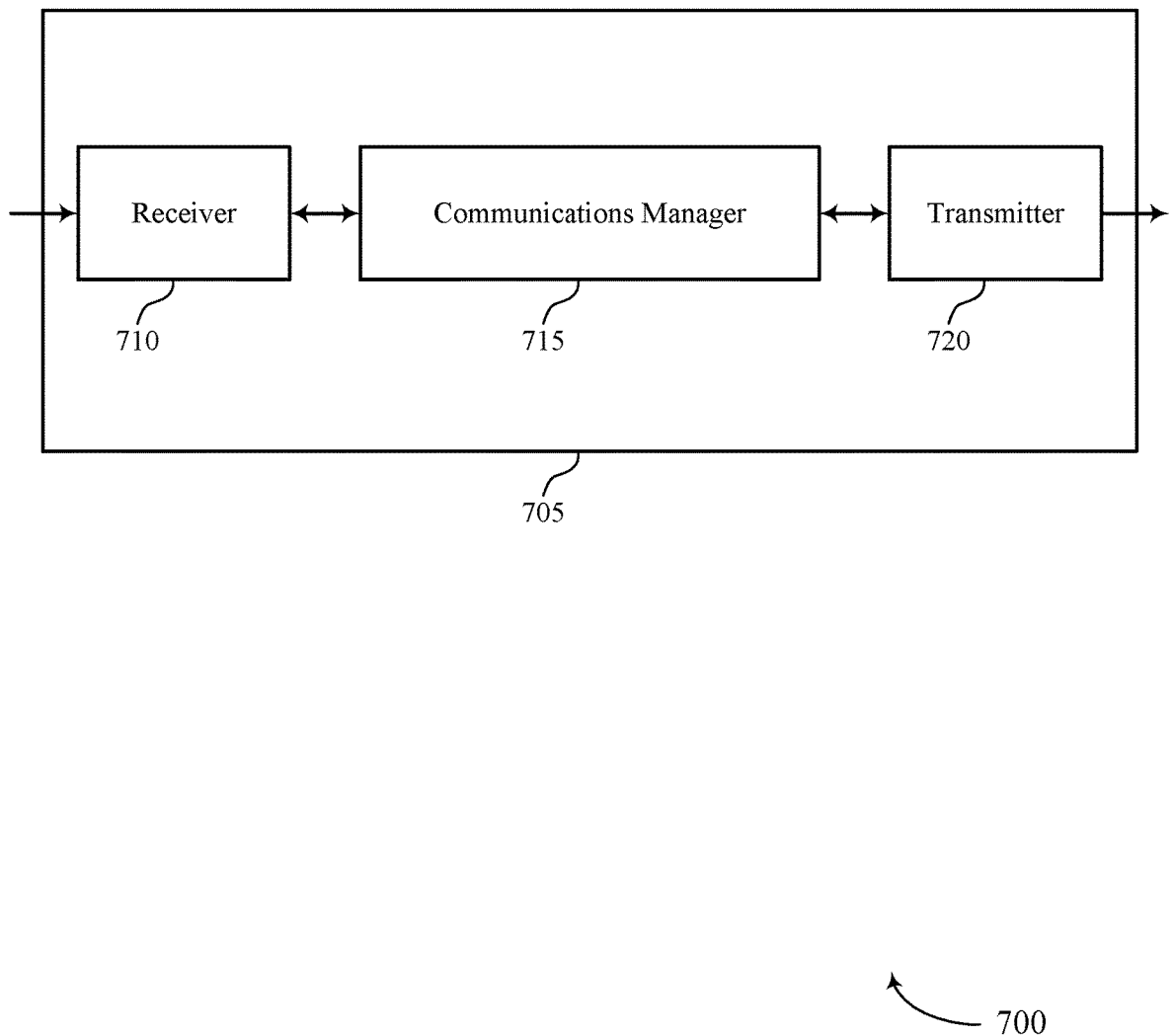
FIGS. 7 and 8 show block diagrams of devices that support operation in aerial dedicated spectrum in accordance with aspects of the present disclosure.

FIG. 7 shows a block diagram 700 of a device 705 that supports operation in aerial dedicated spectrum in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to operation in aerial dedicated spectrum, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a signal or a channel from a cell, determine that the cell supports communications exclusively with aerial UEs based on the signal or the channel, establish a connection with the cell based on the determining, and communicate with the cell over the established connection. The communications manager 715 may also communicate on a first frequency band allocated to aerial UEs and non-aerial UEs, communicate on the second frequency band based on the second frequency band being dedicated to aerial UEs, and receive system information identifying a second frequency band dedicated to aerial UEs. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

By including or configuring the communications manager 715 in accordance with examples as described herein, the device 705 (e.g., a processor controlling or otherwise coupled to the receiver 710, the transmitter 720, the communications manager 715, or a combination thereof) may support techniques for more efficient utilization of communication resources. In particular, because an aerial cell may bar non-aerial UEs from accessing the cell, or a cell may signal, to aerial UEs, frequency bands dedicated to aerial UEs, or a cell may support aerial access categories, aerial UEs may communicate with cells on dedicated resources, resulting in more efficient utilization of communication resources (e.g., resources dedicated to aerial UEs).

Figure 8:
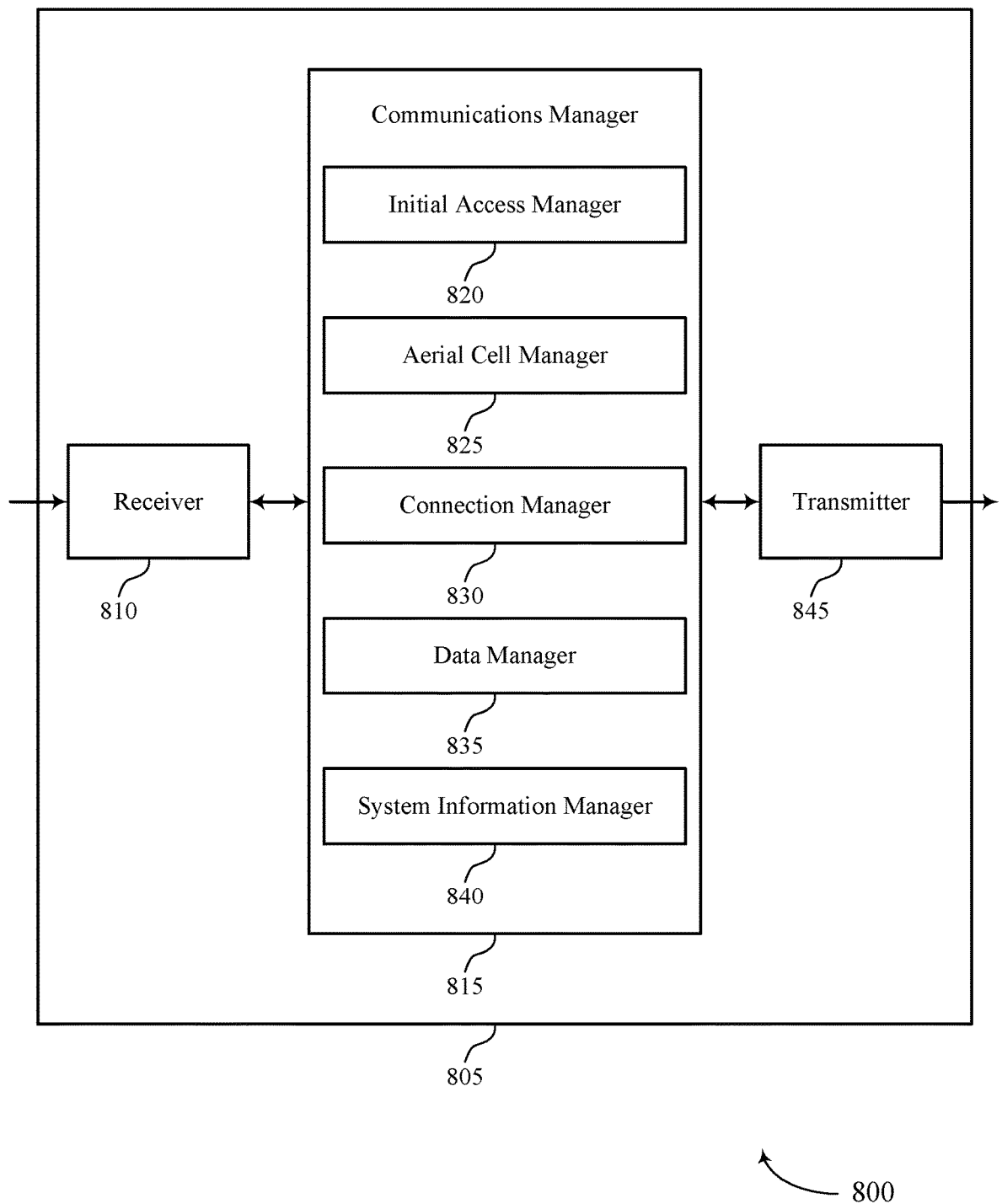

FIG. 8 shows a block diagram 800 of a device 805 that supports operation in aerial dedicated spectrum in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to operation in aerial dedicated spectrum, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an initial access manager 820, an aerial cell manager 825, a connection manager 830, a data manager 835, and a system information manager 840. The communications manager 815 may be an example of aspects of the communications manager 1010 described herein.

The initial access manager 820 may receive a signal or a channel from a cell. The aerial cell manager 825 may determine that the cell supports communications exclusively with aerial UEs based on the signal or the channel. The connection manager 830 may establish a connection with the cell based on the determining. The data manager 835 may communicate with the cell over the established connection.

The data manager 835 may communicate on a first frequency band allocated to aerial UEs and non-aerial UEs. The system information manager 840 may receive system information identifying a second frequency band dedicated to aerial UEs. The data manager 835 may then communicate on the second frequency band based on the second frequency band being dedicated to aerial UEs.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
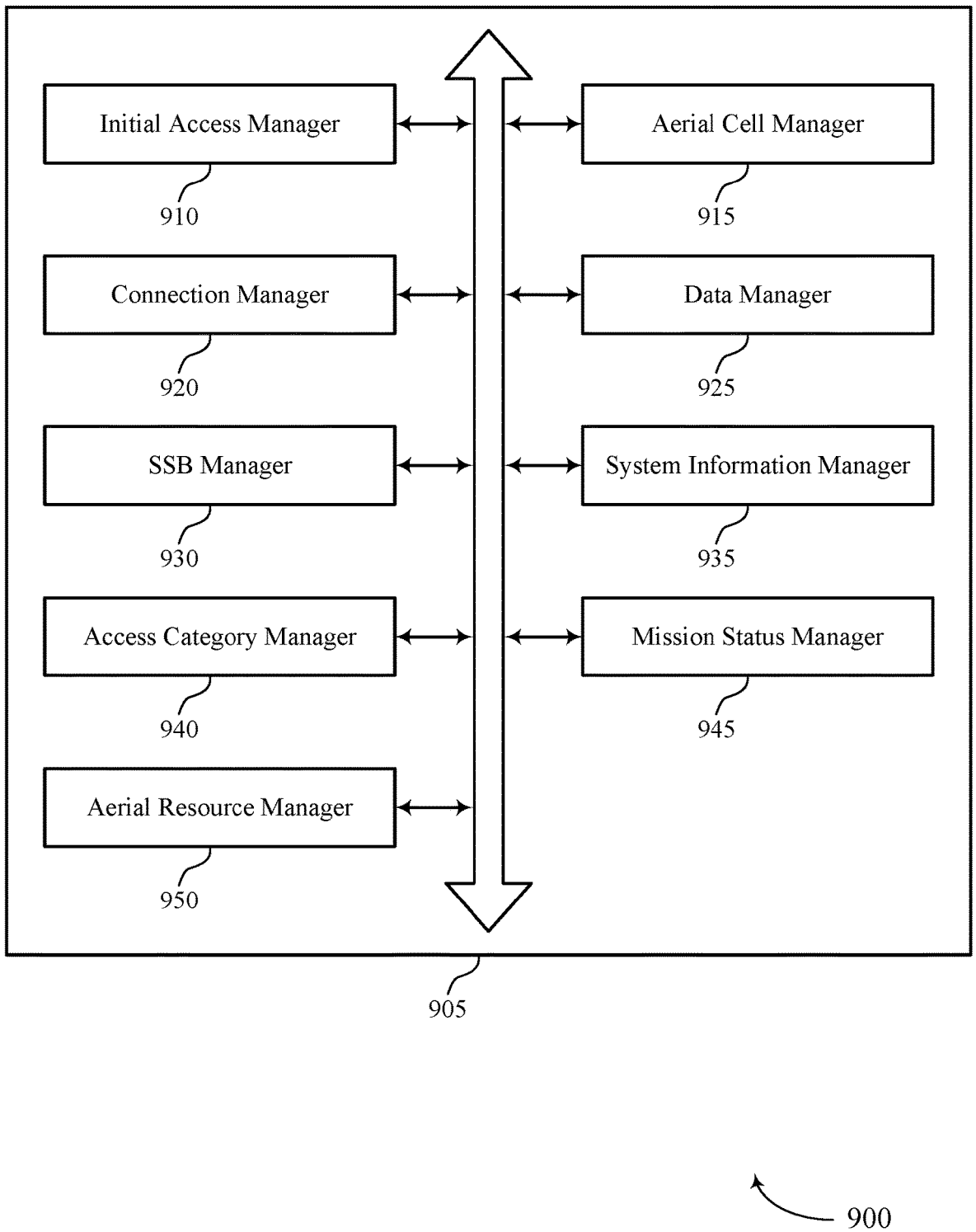
FIG. 9 shows a block diagram of a communications manager that supports operation in aerial dedicated spectrum in accordance with aspects of the present disclosure.

FIG. 9 shows a block diagram 900 of a communications manager 905 that supports operation in aerial dedicated spectrum in accordance with aspects of the present disclosure. The communications manager 905 may be an example of aspects of a communications manager 715, a communications manager 815, or a communications manager 1010 described herein. The communications manager 905 may include an initial access manager 910, an aerial cell manager 915, a connection manager 920, a data manager 925, a SSB manager 930, a system information manager 935, an access category manager 940, a mission status manager 945, and an aerial resource manager 950. Each of these modules may communicate, directly or indirectly, with one another (e.g., via one or more buses).

The initial access manager 910 may receive a signal or a channel from a cell. The aerial cell manager 915 may determine that the cell supports communications exclusively with aerial UEs based on the signal or the channel. In some examples, the aerial cell manager 915 may select a cell supporting communications on the second frequency band. The connection manager 920 may establish a connection with the cell based on the determining. In some examples, the connection manager 920 may establish a connection with the selected cell. The data manager 925 may communicate with the cell over the established connection. In some examples, the data manager 925 may communicate on a first frequency band allocated to aerial UEs and non-aerial UEs. In some examples, the data manager 925 may communicate on the second frequency band based on the second frequency band being dedicated to aerial UEs.

The system information manager 935 may receive system information identifying a second frequency band dedicated to aerial UEs. In some examples, the system information manager 935 may determine that a first barring flag for all UEs in the signal or the channel is set to a first value indicating that all UEs are barred from connecting to the cell. In some examples, the system information manager 935 may determine that a second barring flag for aerial UEs in the signal or the channel is set to a second value indicating that aerial UEs are allowed to connect to the cell. In some cases, the system information further identifies the cell supporting communications on the second frequency band with which the aerial UE is to establish the connection.

The SSB manager 930 may determine that the cell supports communications exclusively with aerial UEs based on the signal or the channel including a PSS sequence reserved for cells supporting communications exclusively with aerial UEs or a SSS reserved for cells supporting communications exclusively with aerial UEs. In some examples, the SSB manager 930 may determine that the cell supports communications exclusively with aerial UEs based on the signal or the channel including a MIB reserved for cells supporting communications exclusively with aerial UEs. In some examples, the SSB manager 930 may determine that the cell supports communications exclusively with aerial UEs based on the signal or the channel including a PBCH scrambling sequence reserved for cells supporting communications exclusively with aerial UEs or a DMRS PBCH sequence reserved for cells supporting communications exclusively with aerial UEs. In some examples, the SSB manager 930 may determine that the cell supports communications exclusively with aerial UEs based on receiving the signal or the channel on a raster frequency reserved for cells supporting communications exclusively with aerial UEs.

The access category manager 940 may receive, in the signal or the channel, a set of aerial access categories supported by the cell. In some examples, the access category manager 940 may determine that an aerial access category of the aerial UE is within the set of aerial access categories supported by the cell, where the establishing the connection is further based on determining that the aerial access category of the aerial UE is within the set of aerial access categories supported by the cell. In some examples, the access category manager 940 may identify a mapping of the mission status of the aerial UE to the aerial access category of the UE, where determining that the aerial access category of the UE is within the set of aerial access categories supported by the cell is based on identifying the mapping.

The mission status manager 945 may determine a mission status of the aerial UE. The aerial resource manager 950 may receive a list of frequency bands in the system information including frequency bands allocated to aerial UEs and non-aerial UEs and frequency bands dedicated to aerial UEs, where the frequency bands dedicated to aerial UEs include the second frequency band. In some examples, the aerial resource manager 950 may receive an indication with each frequency band in the list of frequency bands indicating whether the frequency band is allocated to aerial UEs and non-aerial UEs or dedicated to aerial UEs. In some examples, the aerial resource manager 950 may receive system information including a first list of frequency bands allocated to aerial UEs and non-aerial UEs and a second list of frequency bands dedicated to aerial UEs, where the second list of frequency bands includes the second frequency band. In some cases, the list of frequency bands includes an inter-frequency carrier list or a sidelink frequency information list. In some cases, the first list of frequency bands includes an inter-frequency carrier list or a sidelink frequency information list, and the second list of frequency bands includes an inter-frequency carrier list for aerial UEs or a sidelink frequency information list for aerial UEs.

Figure 10:
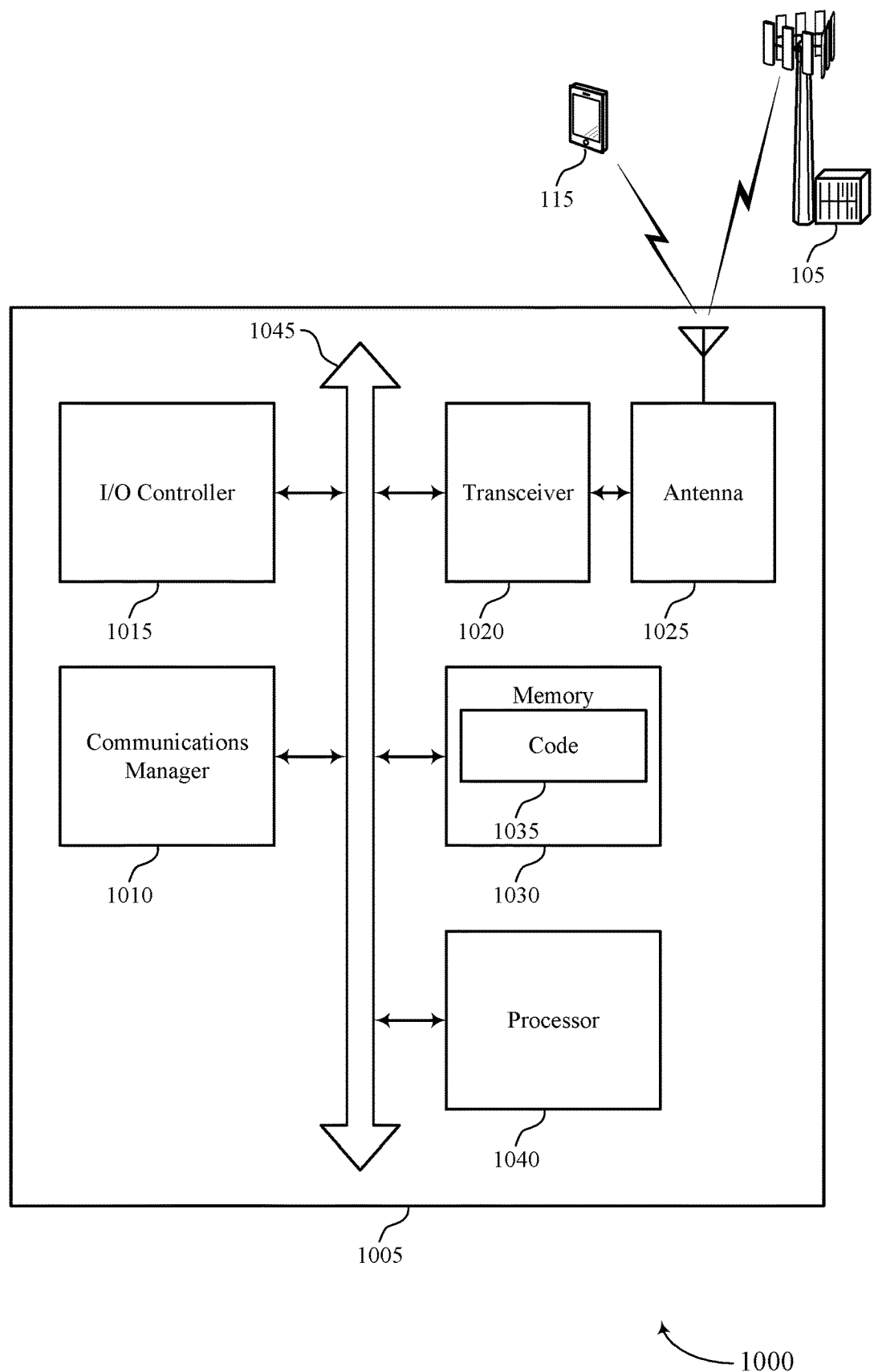
FIG. 10 shows a diagram of a system including a device that supports operation in aerial dedicated spectrum in accordance with aspects of the present disclosure.

FIG. 10 shows a diagram of a system 1000 including a device 1005 that supports operation in aerial dedicated spectrum in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a signal or a channel from a cell, determine that the cell supports communications exclusively with aerial UEs based on the signal or the channel, establish a connection with the cell based on the determining, and communicate with the cell over the established connection. The communications manager 1010 may also communicate on a first frequency band allocated to aerial UEs and non-aerial UEs, receive system information identifying a second frequency band dedicated to aerial UEs, and communicate on the second frequency band based on the second frequency band being dedicated to aerial UEs.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the device 1005 may include a single antenna 1025. However, in some cases the device 1005 may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting operation in aerial dedicated spectrum).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

By including or configuring the communications manager 1010 in accordance with examples as described herein, the device 1005 may support techniques for more efficient utilization of communication resources. In particular, because an aerial cell may bar non-aerial UEs from accessing the cell, or a cell may signal, to aerial UEs, frequency bands dedicated to aerial UEs, or a cell may support aerial access categories, aerial UEs may communicate with cells on dedicated resources, resulting in more efficient utilization of communication resources (e.g., resources dedicated to aerial UEs).

Figure 11:
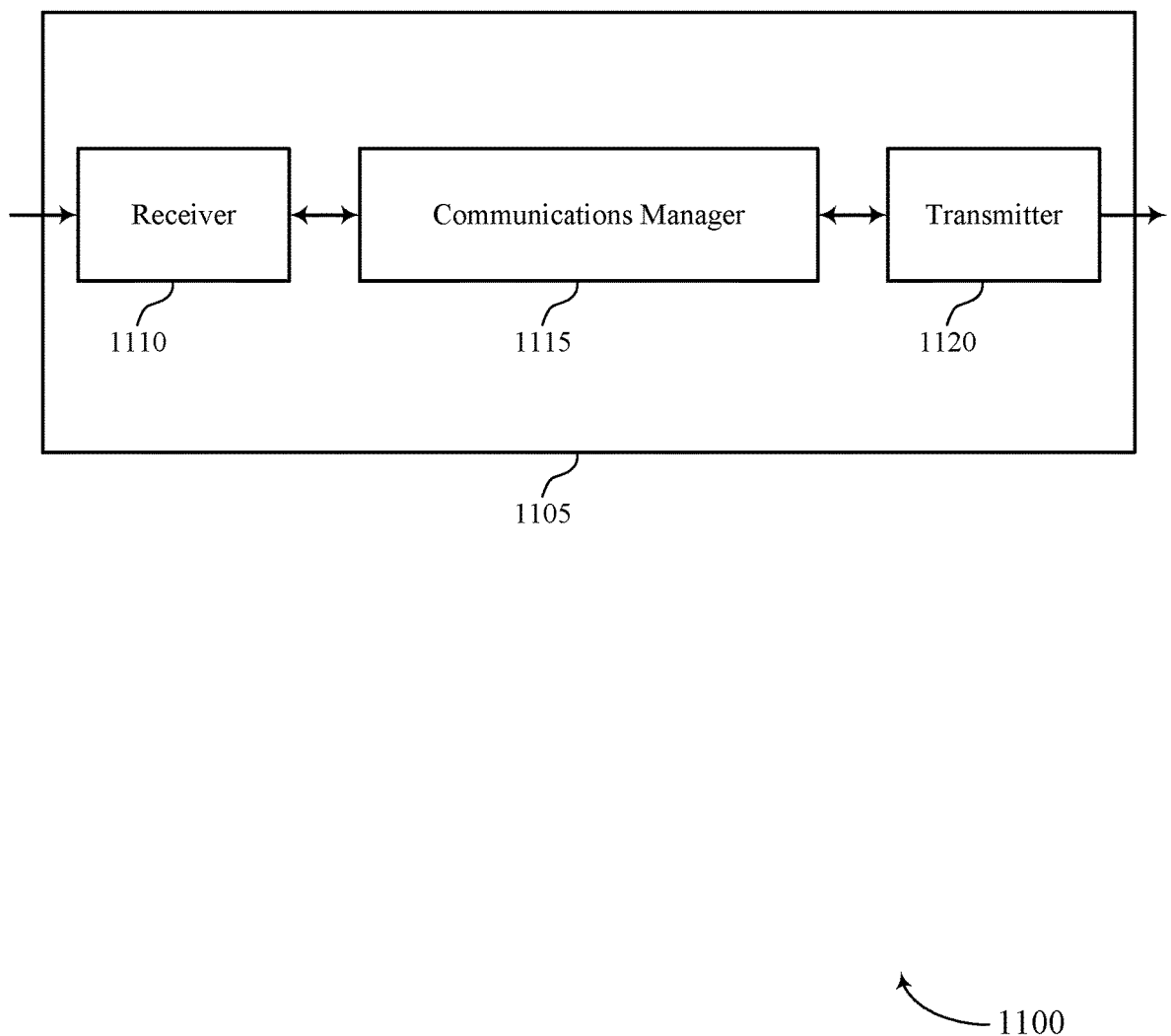
FIGS. 11 and 12 show block diagrams of devices that support operation in aerial dedicated spectrum in accordance with aspects of the present disclosure.

FIG. 11 shows a block diagram 1100 of a device 1105 that supports operation in aerial dedicated spectrum in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to operation in aerial dedicated spectrum, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to one or more UEs, a signal or a channel indicating that the cell supports communications exclusively with aerial UEs, establish a connection with at least one aerial UE based on transmitting the signal or the channel, and communicate with the at least one aerial UE over the established connection. The communications manager 1115 may also communicate with an aerial UE on a first frequency band allocated to aerial UEs and non-aerial UEs, identify a second frequency band dedicated to aerial UEs, and transmit system information identifying the second frequency band dedicated to aerial UEs. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

By including or configuring the communications manager 1115 in accordance with examples as described herein, the device 1105 (e.g., a processor controlling or otherwise coupled to the receiver 1110, the transmitter 1120, the communications manager 1115, or a combination thereof) may support techniques for more efficient utilization of communication resources. In particular, because an aerial cell may bar non-aerial UEs from accessing the cell, or a cell may signal, to aerial UEs, frequency bands dedicated to aerial UEs, or a cell may support aerial access categories, aerial UEs may communicate with cells on dedicated resources, resulting in more efficient utilization of communication resources (e.g., resources dedicated to aerial UEs).

Figure 12:
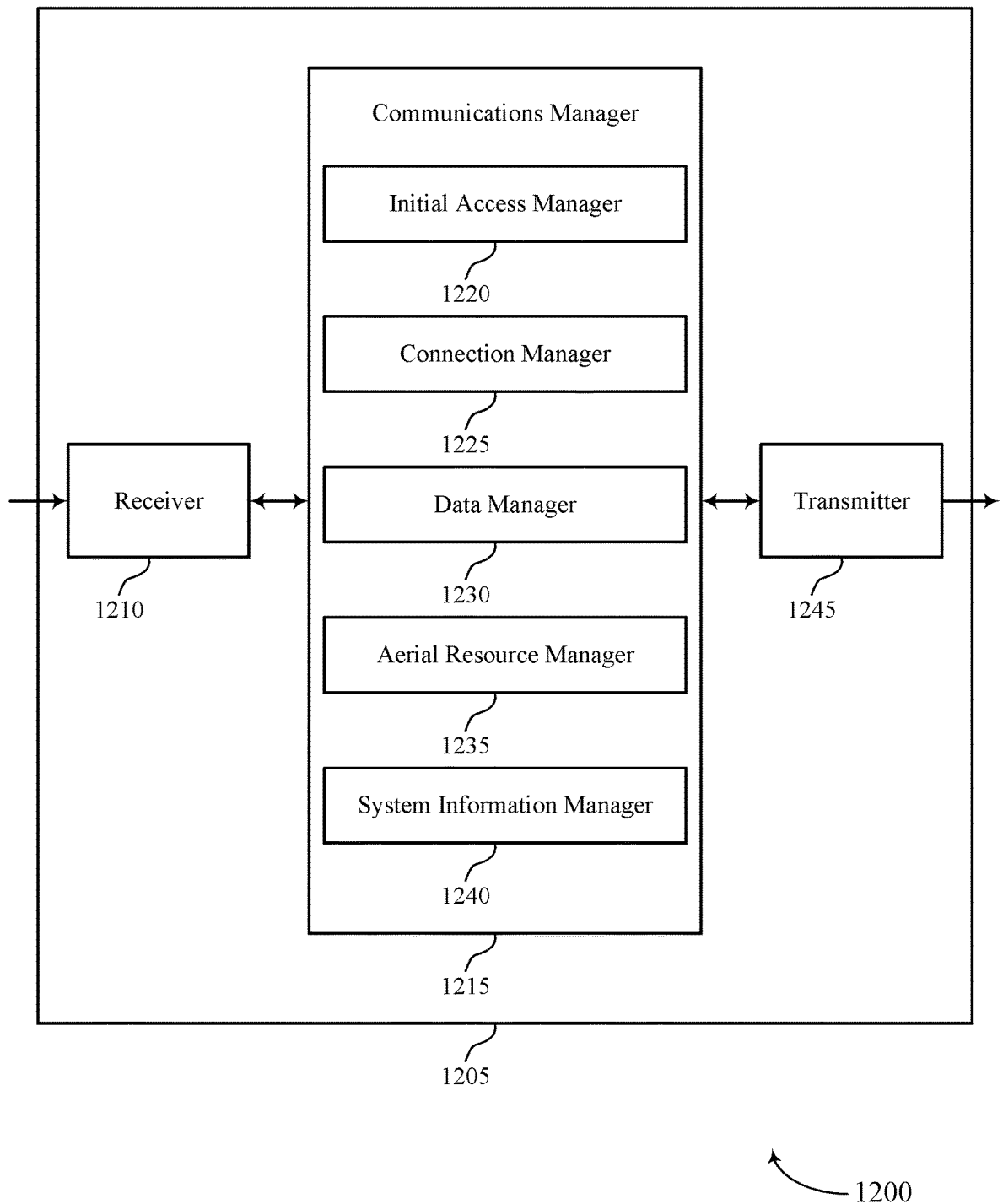

FIG. 12 shows a block diagram 1200 of a device 1205 that supports operation in aerial dedicated spectrum in accordance with aspects of the present disclosure. The device 1205 may be an example of aspects of a device 1105, or a base station 105 as described herein. The device 1205 may include a receiver 1210, a communications manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to operation in aerial dedicated spectrum, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an initial access manager 1220, a connection manager 1225, a data manager 1230, an aerial resource manager 1235, and a system information manager 1240. The communications manager 1215 may be an example of aspects of the communications manager 1410 described herein.

The initial access manager 1220 may transmit, to one or more UEs, a signal or a channel indicating that the cell supports communications exclusively with aerial UEs. The connection manager 1225 may establish a connection with at least one aerial UE based on transmitting the signal or the channel. The data manager 1230 may communicate with the at least one aerial UE over the established connection.

The data manager 1230 may communicate with an aerial UE on a first frequency band allocated to aerial UEs and non-aerial UEs. The aerial resource manager 1235 may identify a second frequency band dedicated to aerial UEs. The system information manager 1240 may transmit system information identifying the second frequency band dedicated to aerial UEs.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
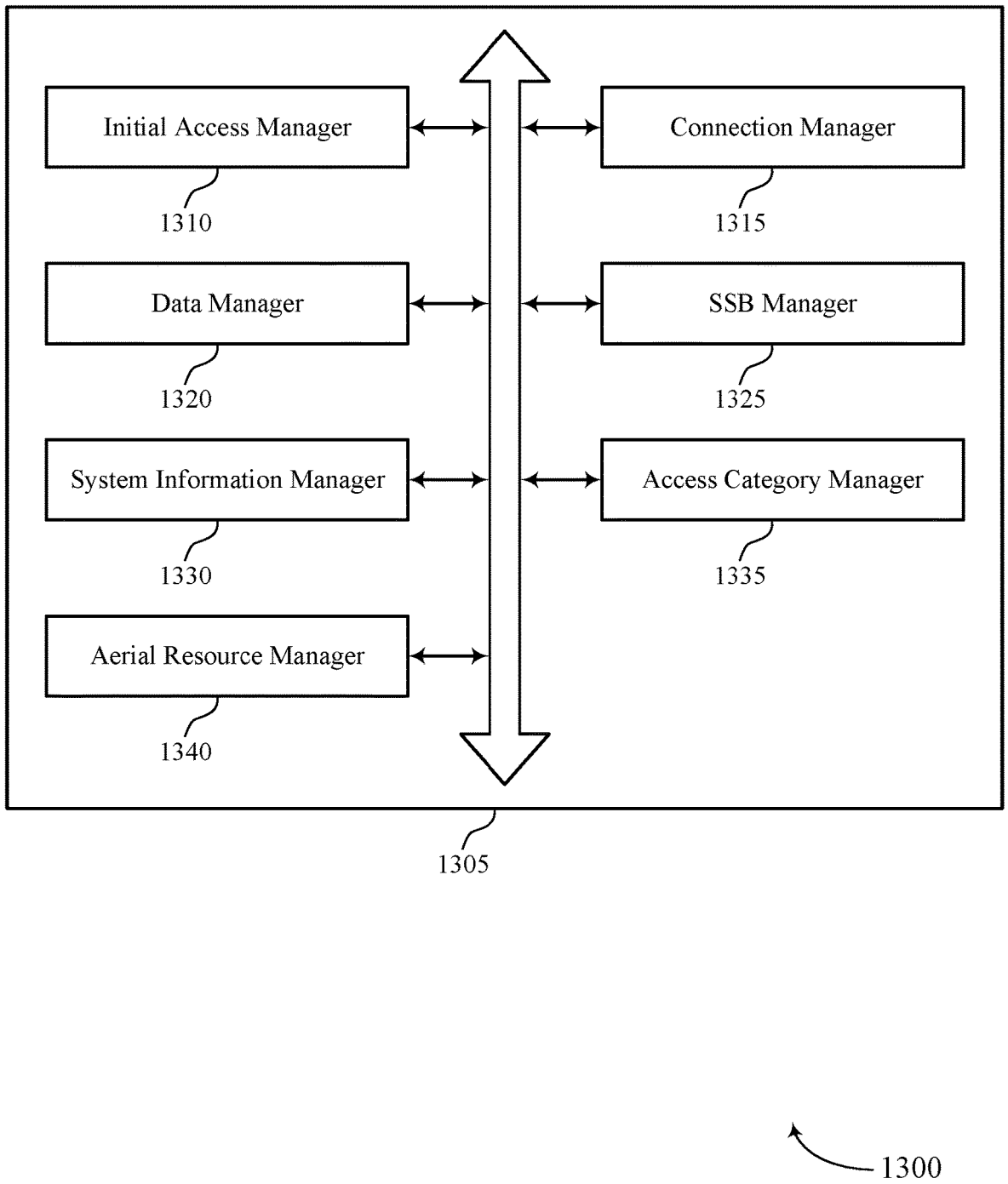
FIG. 13 shows a block diagram of a communications manager that supports operation in aerial dedicated spectrum in accordance with aspects of the present disclosure.

FIG. 13 shows a block diagram 1300 of a communications manager 1305 that supports operation in aerial dedicated spectrum in accordance with aspects of the present disclosure. The communications manager 1305 may be an example of aspects of a communications manager 1115, a communications manager 1215, or a communications manager 1410 described herein. The communications manager 1305 may include an initial access manager 1310, a connection manager 1315, a data manager 1320, a SSB manager 1325, a system information manager 1330, an access category manager 1335, and an aerial resource manager 1340. Each of these modules may communicate, directly or indirectly, with one another (e.g., via one or more buses).

The initial access manager 1310 may transmit, to one or more UEs, a signal or a channel indicating that the cell supports communications exclusively with aerial UEs. The connection manager 1315 may establish a connection with at least one aerial UE based on transmitting the signal or the channel. The data manager 1320 may communicate with the at least one aerial UE over the established connection. In some examples, the data manager 1320 may communicate with an aerial UE on a first frequency band allocated to aerial UEs and non-aerial UEs.

The system information manager 1330 may transmit system information identifying the second frequency band dedicated to aerial UEs. In some examples, the system information manager 1330 may set a first barring flag for all UEs in the signal or the channel to a first value indicating that all UEs are barred from connecting to the cell. In some examples, the system information manager 1330 may set a second barring flag for aerial UEs in the signal or the channel to a second value indicating that aerial UEs are allowed to connect to the cell. In some cases, the system information further identifies a cell with which the aerial UE is to establish a connection for communications on the second frequency band.

The aerial resource manager 1340 may identify a second frequency band dedicated to aerial UEs. In some examples, the aerial resource manager 1340 may transmit a list of frequency bands in the system information including frequency bands allocated to aerial UEs and non-aerial UEs and frequency bands dedicated to aerial UEs, where the frequency bands dedicated to aerial UEs include the second frequency band. In some examples, the aerial resource manager 1340 may transmit an indication with each frequency band in the list of frequency bands indicating whether the frequency band is allocated to aerial UEs and non-aerial UEs or dedicated to aerial UEs. In some examples, the aerial resource manager 1340 may transmit system information including a first list of frequency bands allocated to aerial UEs and non-aerial UEs and a second list of frequency bands dedicated to aerial UEs, where the second list of frequency bands includes the second frequency band. In some cases, the list of frequency bands includes an inter-frequency carrier list or a sidelink frequency information list. In some cases, the first list of frequency bands includes an inter-frequency carrier list or a sidelink frequency information list, and the second list of frequency bands includes an inter-frequency carrier list for aerial UEs or a sidelink frequency information list for aerial UEs.

The SSB manager 1325 may transmit the signal or the channel with a PSS sequence reserved for cells supporting communications exclusively with aerial UEs or a SSS reserved for cells supporting communications exclusively with aerial UEs. In some examples, the SSB manager 1325 may transmit the signal or the channel with a MIB reserved for cells supporting communications exclusively with aerial UEs. In some examples, the SSB manager 1325 may transmit the signal or the channel with a PBCH scrambling sequence reserved for cells supporting communications exclusively with aerial UEs or a DMRS PBCH sequence reserved for cells supporting communications exclusively with aerial UEs. In some examples, the SSB manager 1325 may transmit the signal or the channel on a raster frequency reserved for cells supporting communications exclusively with aerial UEs.

The access category manager 1335 may transmit, in the signal or the channel, a set of aerial access categories supported by the cell. In some examples, the access category manager 1335 may determine that an aerial access category of the at least one aerial UE is within the set of aerial access categories supported by the cell, where the establishing the connection is further based on determining that the aerial access category of the at least one aerial UE is within the set of aerial access categories supported by the cell.

Figure 14:
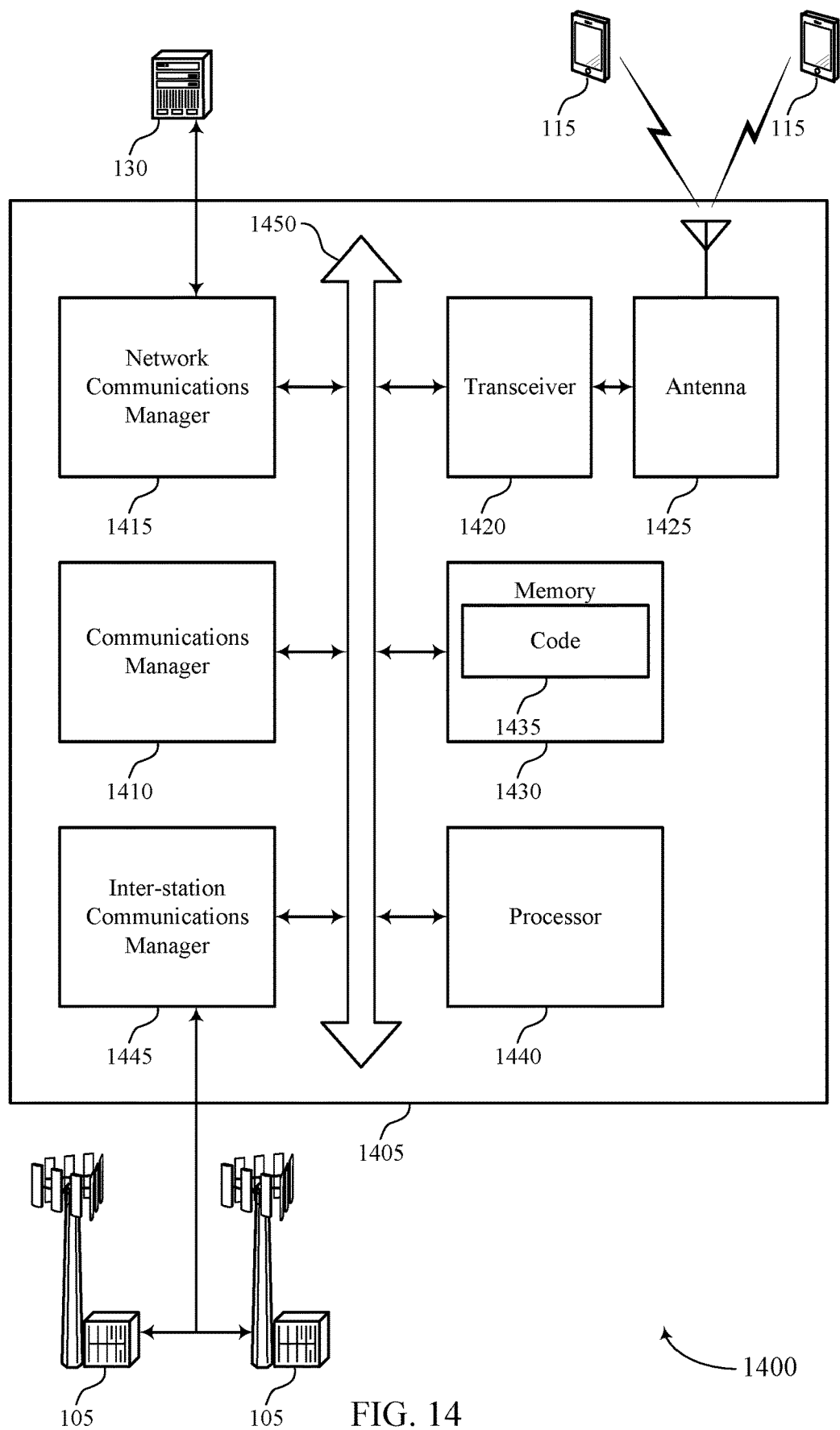
FIG. 14 shows a diagram of a system including a device that supports operation in aerial dedicated spectrum in accordance with aspects of the present disclosure.

FIG. 14 shows a diagram of a system 1400 including a device 1405 that supports operation in aerial dedicated spectrum in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445.

These components may be in electronic communication via one or more buses (e.g., bus 1450).

The communications manager 1410 may transmit, to one or more UEs, a signal or a channel indicating that the cell supports communications exclusively with aerial UEs, establish a connection with at least one aerial UE based on transmitting the signal or the channel, and communicate with the at least one aerial UE over the established connection. The communications manager 1410 may also communicate with an aerial UE on a first frequency band allocated to aerial UEs and non-aerial UEs, identify a second frequency band dedicated to aerial UEs, and transmit system information identifying the second frequency band dedicated to aerial UEs.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the device 1405 may include a single antenna 1425. However, in some cases the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting operation in aerial dedicated spectrum).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

By including or configuring the communications manager 1410 in accordance with examples as described herein, the device 1405 may support techniques for more efficient utilization of communication resources. In particular, because an aerial cell may bar non-aerial UEs from accessing the cell, or a cell may signal, to aerial UEs, frequency bands dedicated to aerial UEs, or a cell may support aerial access categories, aerial UEs may communicate with cells on dedicated resources, resulting in more efficient utilization of communication resources (e.g., resources dedicated to aerial UEs).

Figure 15:
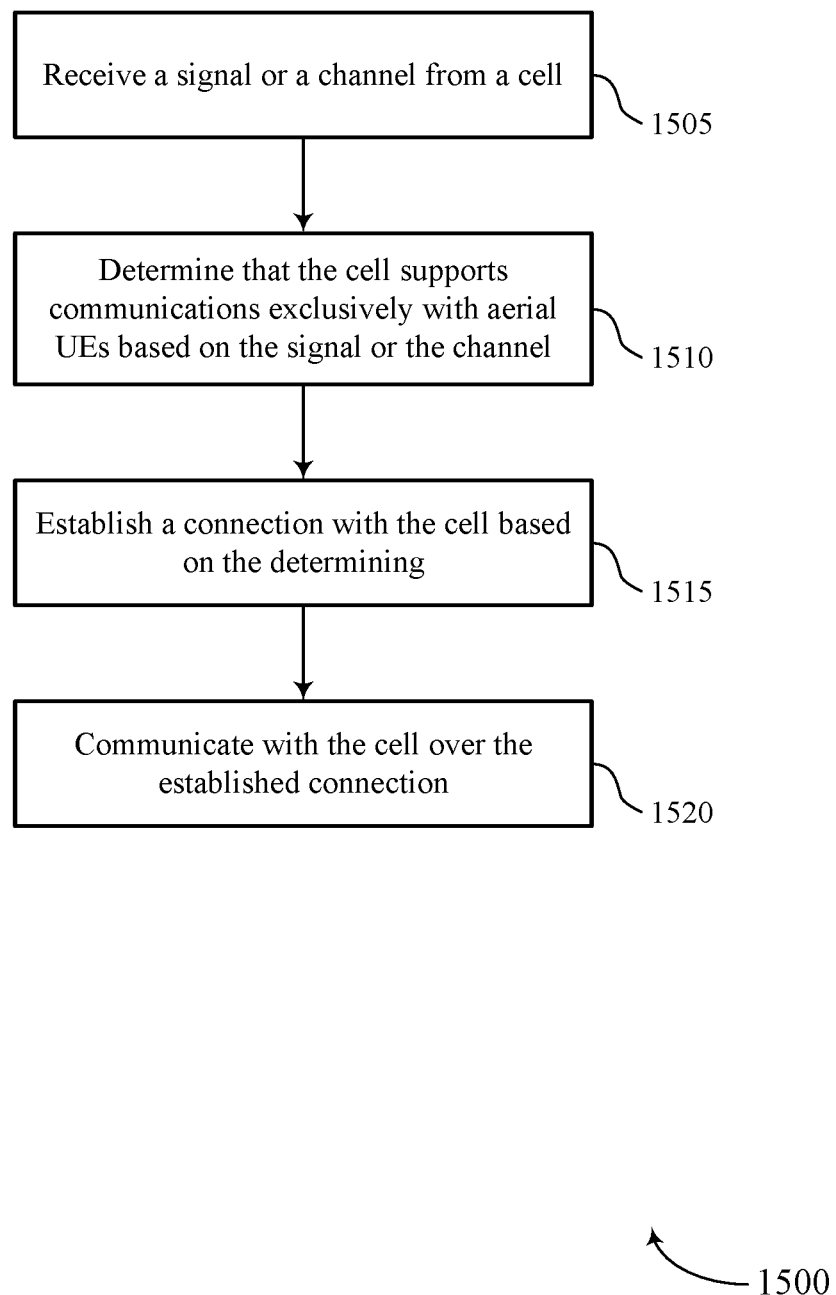
FIGS. 15 through 18 show flowcharts illustrating methods that support operation in aerial dedicated spectrum in accordance with aspects of the present disclosure.

FIG. 15 shows a flowchart illustrating a method 1500 that supports operation in aerial dedicated spectrum in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may receive a signal or a channel from a cell. The operations of 1505 may be performed according to the methods described herein. In some examples, aspects of the operations of 1505 may be performed by an initial access manager as described with reference to FIGS. 7 through 10.

At 1510, the UE may determine that the cell supports communications exclusively with aerial UEs based on the signal or the channel. The operations of 1510 may be performed according to the methods described herein. In some examples, aspects of the operations of 1510 may be performed by an aerial cell manager as described with reference to FIGS. 7 through 10.

At 1515, the UE may establish a connection with the cell based on the determining. The operations of 1515 may be performed according to the methods described herein. In some examples, aspects of the operations of 1515 may be performed by a connection manager as described with reference to FIGS. 7 through 10.

At 1520, the UE may communicate with the cell over the established connection. The operations of 1520 may be performed according to the methods described herein. In some examples, aspects of the operations of 1520 may be performed by a data manager as described with reference to FIGS. 7 through 10.

Figure 16:
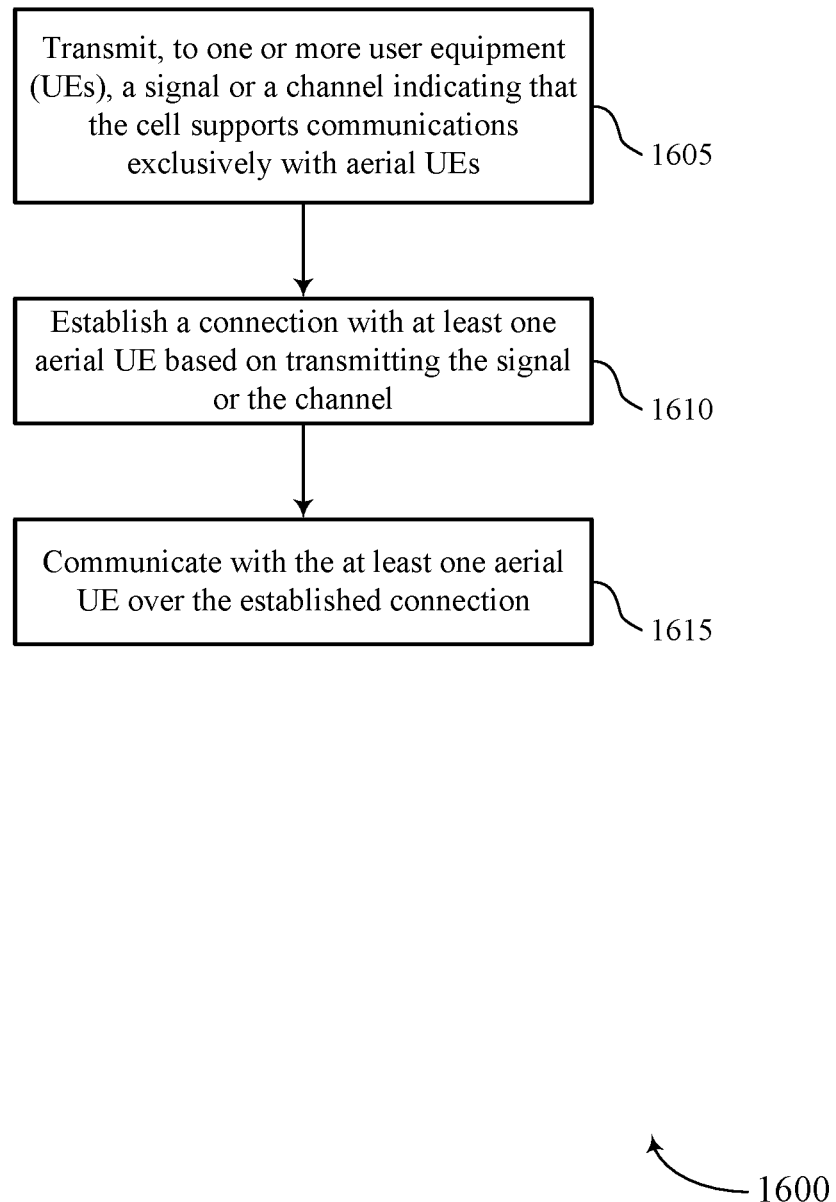

FIG. 16 shows a flowchart illustrating a method 1600 that supports operation in aerial dedicated spectrum in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1605, the base station may transmit, to one or more UEs, a signal or a channel indicating that the cell supports communications exclusively with aerial UEs. The operations of 1605 may be performed according to the methods described herein. In some examples, aspects of the operations of 1605 may be performed by an initial access manager as described with reference to FIGS. 11 through 14.

At 1610, the base station may establish a connection with at least one aerial UE based on transmitting the signal or the channel. The operations of 1610 may be performed according to the methods described herein. In some examples, aspects of the operations of 1610 may be performed by a connection manager as described with reference to FIGS. 11 through 14.

At 1615, the base station may communicate with the at least one aerial UE over the established connection. The operations of 1615 may be performed according to the methods described herein. In some examples, aspects of the operations of 1615 may be performed by a data manager as described with reference to FIGS. 11 through 14.

Figure 17:
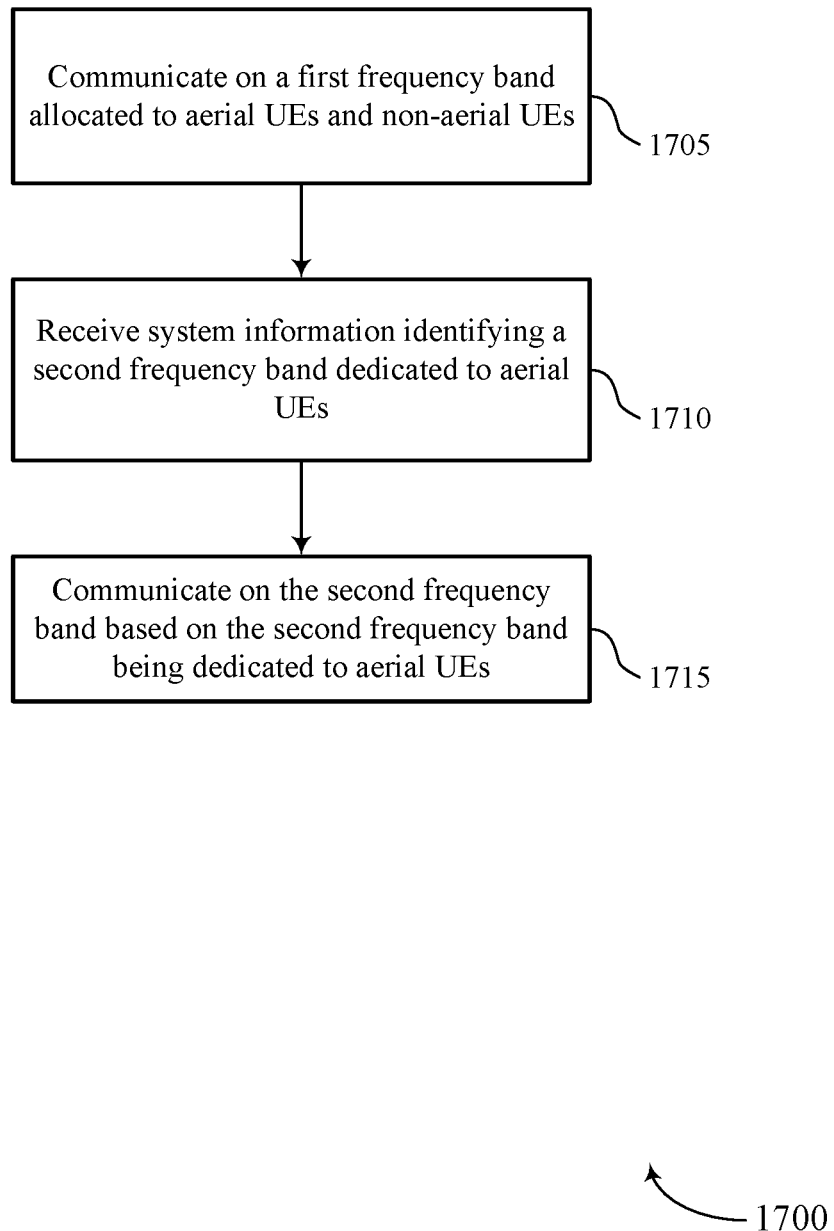

FIG. 17 shows a flowchart illustrating a method 1700 that supports operation in aerial dedicated spectrum in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1705, the UE may communicate on a first frequency band allocated to aerial UEs and non-aerial UEs. The operations of 1705 may be performed according to the methods described herein. In some examples, aspects of the operations of 1705 may be performed by a data manager as described with reference to FIGS. 7 through 10.

At 1710, the UE may receive system information identifying a second frequency band dedicated to aerial UEs. The operations of 1710 may be performed according to the methods described herein. In some examples, aspects of the operations of 1710 may be performed by a system information manager as described with reference to FIGS. 7 through 10.

At 1715, the UE may communicate on the second frequency band based on the second frequency band being dedicated to aerial UEs. The operations of 1715 may be performed according to the methods described herein. In some examples, aspects of the operations of 1715 may be performed by a data manager as described with reference to FIGS. 7 through 10.

Figure 18:
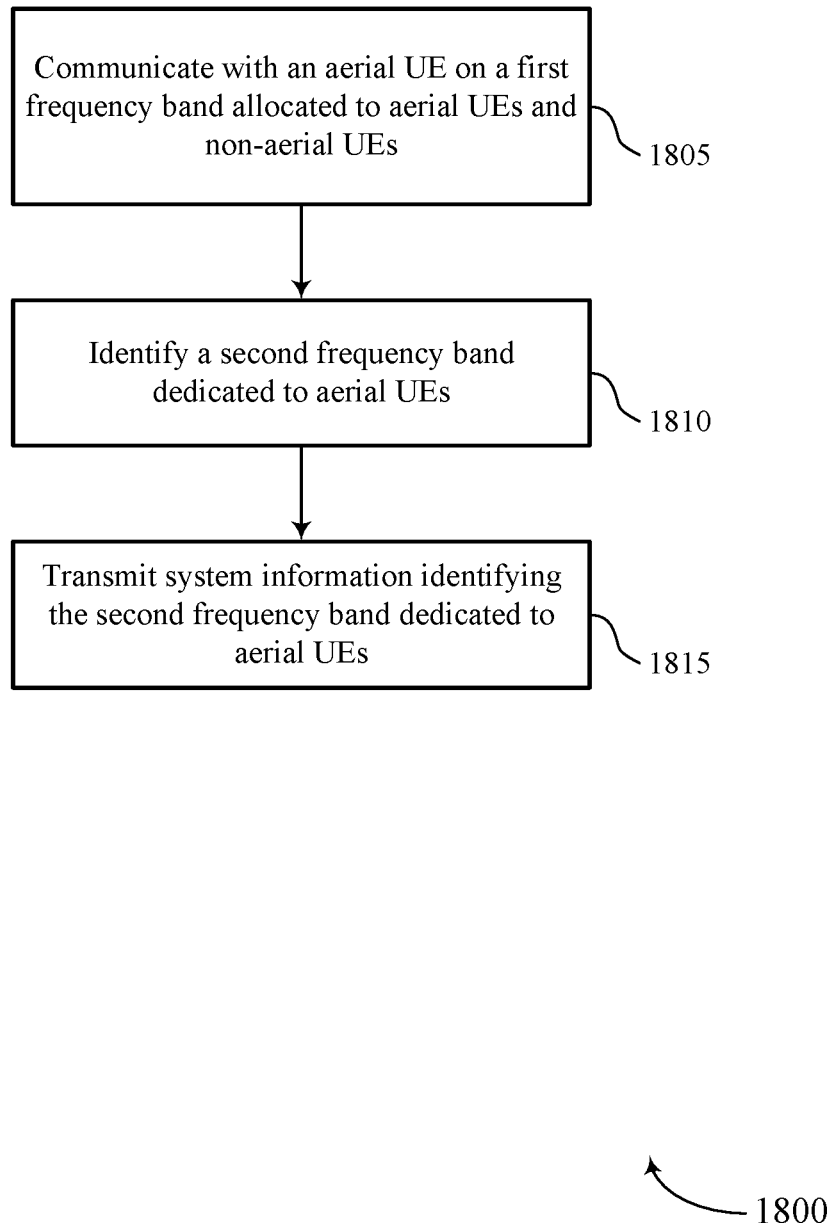

FIG. 18 shows a flowchart illustrating a method 1800 that supports operation in aerial dedicated spectrum in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1805, the base station may communicate with an aerial UE on a first frequency band allocated to aerial UEs and non-aerial UEs. The operations of 1805 may be performed according to the methods described herein. In some examples, aspects of the operations of 1805 may be performed by a data manager as described with reference to FIGS. 11 through 14.

At 1810, the base station may identify a second frequency band dedicated to aerial UEs. The operations of 1810 may be performed according to the methods described herein. In some examples, aspects of the operations of 1810 may be performed by an aerial resource manager as described with reference to FIGS. 11 through 14.

At 1815, the base station may transmit system information identifying the second frequency band dedicated to aerial UEs. The operations of 1815 may be performed according to the methods described herein. In some examples, aspects of the operations of 1815 may be performed by a system information manager as described with reference to FIGS. 11 through 14.

The following provides an overview of aspects of the present disclosure:

Aspect 1: A method for wireless communication at an aerial UE, comprising: receiving a signal or a channel from a cell; determining that the cell supports communications exclusively with aerial UEs based at least in part on the signal or the channel; establishing a connection with the cell based at least in part on the determining; and communicating with the cell over the established connection.

Aspect 2: The method of aspect 1, wherein determining that the cell supports communications exclusively with aerial UEs based at least in part on the signal or the channel comprises: determining that the cell supports communications exclusively with aerial UEs based at least in part on the signal or the channel comprising an PSS sequence reserved for cells supporting communications exclusively with aerial UEs or an SSS sequence reserved for cells supporting communications exclusively with aerial UEs.

Aspect 3: The method of any of aspects 1 through 2, wherein determining that the cell supports communications exclusively with aerial UEs based at least in part on the signal or the channel comprises: determining that the cell supports communications exclusively with aerial UEs based at least in part on the signal or the channel comprising a master information block (MIB) reserved for cells supporting communications exclusively with aerial UEs.

Aspect 4: The method of any of aspects 1 through 3, wherein determining that the cell supports communications exclusively with aerial UEs based at least in part on the signal or the channel comprises: determining that the cell supports communications exclusively with aerial UEs based at least in part on the signal or the channel comprising a PBCH scrambling sequence reserved for cells supporting communications exclusively with aerial UEs or a DMRS PBCH sequence reserved for cells supporting communications exclusively with aerial UEs.

Aspect 5: The method of any of aspects 1 through 4, wherein determining that the cell supports communications exclusively with aerial UEs based at least in part on the signal or the channel comprises: determining that the cell supports communications exclusively with aerial UEs based at least in part on receiving the signal or the channel on a raster frequency reserved for cells supporting communications exclusively with aerial UEs.

Aspect 6: The method of any of aspects 1 through 5, wherein determining that the cell supports communications exclusively with aerial UEs based at least in part on the signal or the channel comprises: determining that a first barring flag for all UEs in the signal or the channel is set to a first value indicating that all UEs are barred from connecting to the cell; and determining that a second barring flag for aerial UEs in the signal or the channel is set to a second value indicating that aerial UEs are allowed to connect to the cell.

Aspect 7: The method of any of aspects 1 through 6, further comprising: receiving, in the signal or the channel, a set of aerial access categories supported by the cell; and determining that an aerial access category of the aerial UE is within the set of aerial access categories supported by the cell, wherein the establishing the connection is further based on determining that the aerial access category of the aerial UE is within the set of aerial access categories supported by the cell.

Aspect 8: The method of any of aspects 1 through 7, further comprising: determining a mission status of the aerial UE; and identifying a mapping of the mission status of the aerial UE to the aerial access category of the UE, wherein determining that the aerial access category of the UE is within the set of aerial access categories supported by the cell is based at least in part on identifying the mapping.

Aspect 9: A method for wireless communication at a cell, comprising: transmitting, to one or more UEs, a signal or a channel indicating that the cell supports communications exclusively with aerial UEs; establishing a connection with at least one aerial UE based at least in part on transmitting the signal or the channel; and communicating with the at least one aerial UE over the established connection.

Aspect 10: The method of aspect 9, wherein transmitting the signal or the channel indicating that the cell supports communications exclusively with aerial UEs comprises: transmitting the signal or the channel with an PSS sequence reserved for cells supporting communications exclusively with aerial UEs or an SSS sequence reserved for cells supporting communications exclusively with aerial UEs.

Aspect 11: The method of any of aspects 9 through 10, wherein transmitting the signal or the channel indicating that the cell supports communications exclusively with aerial UEs comprises: transmitting the signal or the channel with a master information block (MIB) reserved for cells supporting communications exclusively with aerial UEs.

Aspect 12: The method of any of aspects 9 through 11, wherein transmitting the signal or the channel indicating that the cell supports communications exclusively with aerial UEs comprises: transmitting the signal or the channel with a PBCH scrambling sequence reserved for cells supporting communications exclusively with aerial UEs or a DMRS PBCH sequence reserved for cells supporting communications exclusively with aerial UEs.

Aspect 13: The method of any of aspects 9 through 12, wherein transmitting the signal or the channel indicating that the cell supports communications exclusively with aerial UEs comprises: transmitting the signal or the channel on a raster frequency reserved for cells supporting communications exclusively with aerial UEs.

Aspect 14: The method of any of aspects 9 through 13, wherein transmitting the signal or the channel indicating that the cell supports communications exclusively with aerial UEs comprises: setting a first barring flag for all UEs in the signal or the channel to a first value indicating that all UEs are barred from connecting to the cell; and setting a second barring flag for aerial UEs in the signal or the channel to a second value indicating that aerial UEs are allowed to connect to the cell.

Aspect 15: The method of any of aspects 9 through 14, further comprising: transmitting, in the signal or the channel, a set of aerial access categories supported by the cell; and determining that an aerial access category of the at least one aerial UE is within the set of aerial access categories supported by the cell, wherein the establishing the connection is further based on determining that the aerial access category of the at least one aerial UE is within the set of aerial access categories supported by the cell.

Aspect 16: A method for wireless communication at a first aerial UE, comprising: communicating on a first frequency band allocated to aerial UEs and non-aerial UEs; receiving system information identifying a second frequency band dedicated to aerial UEs; and communicating on the second frequency band based at least in part on the second frequency band being dedicated to aerial UEs.

Aspect 17: The method of aspect 16, wherein receiving the system information identifying the second frequency band comprises: receiving a list of frequency bands in the system information comprising frequency bands allocated to aerial UEs and non-aerial UEs and frequency bands dedicated to aerial UEs, wherein the frequency bands dedicated to aerial UEs comprise the second frequency band.

Aspect 18: The method of aspect 17, further comprising: receiving an indication with each frequency band in the list of frequency bands indicating whether the frequency band is allocated to aerial UEs and non-aerial UEs or dedicated to aerial UEs.

Aspect 19: The method of any of aspects 17 through 18, wherein the list of frequency bands comprises an inter-frequency carrier list or a sidelink frequency information list.

Aspect 20: The method of any of aspects 16 through 19, wherein receiving the system information identifying the second frequency band comprises: receiving the system information comprising a first list of frequency bands allocated to aerial UEs and non-aerial UEs and a second list of frequency bands dedicated to aerial UEs, wherein the second list of frequency bands comprises the second frequency band.

Aspect 21: The method of aspect 20, wherein the first list of frequency bands comprises an inter-frequency carrier list or a sidelink frequency information list, and the second list of frequency bands comprises an inter-frequency carrier list for aerial UEs or a sidelink frequency information list for aerial UEs.

Aspect 22: The method of any of aspects 16 through 21, further comprising: selecting a cell supporting communications on the second frequency band; and establishing a connection with the selected cell.

Aspect 23: The method of aspect 22, wherein the system information further identifies the cell supporting communications on the second frequency band with which the aerial UE is to establish the connection.

Aspect 24: A method for wireless communication at a base station, comprising: communicating with an aerial UE on a first frequency band allocated to aerial UEs and non-aerial UEs; identifying a second frequency band dedicated to aerial UEs; and transmitting system information identifying the second frequency band dedicated to aerial UEs.

Aspect 25: The method of aspect 24, wherein transmitting the system information identifying the second frequency band comprises: transmitting a list of frequency bands in the system information comprising frequency bands allocated to aerial UEs and non-aerial UEs and frequency bands dedicated to aerial UEs, wherein the frequency bands dedicated to aerial UEs comprise the second frequency band.

Aspect 26: The method of aspect 25, further comprising: transmitting an indication with each frequency band in the list of frequency bands indicating whether the frequency band is allocated to aerial UEs and non-aerial UEs or dedicated to aerial UEs.

Aspect 27: The method of any of aspects 25 through 26, wherein the list of frequency bands comprises an inter-frequency carrier list or a sidelink frequency information list.

Aspect 28: The method of any of aspects 24 through 27, wherein transmitting the system information identifying the second frequency band comprises: transmitting the system information comprising a first list of frequency bands allocated to aerial UEs and non-aerial UEs and a second list of frequency bands dedicated to aerial UEs, wherein the second list of frequency bands comprises the second frequency band.

Aspect 29: The method of aspect 28, wherein the first list of frequency bands comprises an inter-frequency carrier list or a sidelink frequency information list, and the second list of frequency bands comprises an inter-frequency carrier list for aerial UEs or a sidelink frequency information list for aerial UEs.

Aspect 30: The method of any of aspects 24 through 29, wherein the system information further identifies a cell with which the aerial UE is to establish a connection for communications on the second frequency band.

Aspect 31: An apparatus for wireless communication at an aerial UE, comprising a processor; memory coupled with the processor; and instructions stored in the memory and executable by the processor to cause the apparatus to perform a method of any of aspects 1 through 8.

Aspect 32: An apparatus for wireless communication at an aerial UE, comprising at least one means for performing a method of any of aspects 1 through 8.

Aspect 33: A non-transitory computer-readable medium storing code for wireless communication at an aerial UE, the code comprising instructions executable by a processor to perform a method of any of aspects 1 through 8.

Aspect 34: An apparatus for wireless communication at a cell, comprising a processor; memory coupled with the processor; and instructions stored in the memory and executable by the processor to cause the apparatus to perform a method of any of aspects 9 through 15.

Aspect 35: An apparatus for wireless communication at a cell, comprising at least one means for performing a method of any of aspects 9 through 15.

Aspect 36: A non-transitory computer-readable medium storing code for wireless communication at a cell, the code comprising instructions executable by a processor to perform a method of any of aspects 9 through 15.

Aspect 37: An apparatus for wireless communication at a first aerial UE, comprising a processor; memory coupled with the processor; and instructions stored in the memory and executable by the processor to cause the apparatus to perform a method of any of aspects 16 through 23.

Aspect 38: An apparatus for wireless communication at a first aerial UE, comprising at least one means for performing a method of any of aspects 16 through 23.

Aspect 39: A non-transitory computer-readable medium storing code for wireless communication at a first aerial UE, the code comprising instructions executable by a processor to perform a method of any of aspects 16 through 23.

Aspect 40: An apparatus for wireless communication at a base station, comprising a processor; memory coupled with the processor; and instructions stored in the memory and executable by the processor to cause the apparatus to perform a method of any of aspects 24 through 30.

Aspect 41: An apparatus for wireless communication at a base station, comprising at least one means for performing a method of any of aspects 24 through 30.

Aspect 42: A non-transitory computer-readable medium storing code for wireless communication at a base station, the code comprising instructions executable by a processor to perform a method of any of aspects 24 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
one or more processors;
one or more memories coupled with the one or more processors; and
instructions stored in the one or more memories and executable by the one or more processors to cause the apparatus to:
receive a signal or a channel from a cell, the signal or the channel comprising a synchronization signal block via a raster frequency reserved for cells supporting communications exclusively with aerial user equipment (UEs), the communications associated with applications related to collision detection, collision avoidance, or both;
establish, after receiving the signal, a connection with the cell based at least in part on the cell supporting communications exclusively with aerial UEs; and
communicate with the cell via the established connection.

2. The apparatus of claim 1, wherein the cell supports communications exclusively with aerial UEs based at least in part on the signal or the channel comprising a primary synchronization signal (PSS) sequence reserved for the cells supporting communications exclusively with aerial UEs or a secondary synchronization signal (SSS) sequence reserved for the cells supporting communications exclusively with aerial UEs.

3. The apparatus of claim 1, wherein the cell supports communications exclusively with aerial UEs based at least in part on the signal or the channel comprising a master information block (MIB) reserved for the cells supporting communications exclusively with aerial UEs.

4. The apparatus of claim 1, wherein the cell supports communications exclusively with aerial UEs based at least in part on the signal or the channel comprising a physical broadcast channel (PBCH) scrambling sequence reserved for the cells supporting communications exclusively with aerial UEs or a demodulation reference signal (DMRS) physical broadcast channel (PBCH) sequence reserved for the cells supporting communications exclusively with aerial UEs.

5. The apparatus of claim 1, wherein the cell supports communications exclusively with aerial UEs based at least in part on a first barring flag for all UEs in the signal or the channel being set to a first value indicating that all UEs are barred from connecting to the cell and a second barring flag for aerial UEs in the signal or the channel being set to a second value indicating that aerial UEs are allowed to connect to the cell.

6. The apparatus of claim 1, wherein the instructions are further executable by the one or more processors to cause the apparatus to:
receive, in the signal or the channel, a set of aerial access categories supported by the cell, wherein an aerial access category of the apparatus is within the set of aerial access categories supported by the cell, and wherein the establishing the connection is further based at least in part on the aerial access category of the apparatus being within the set of aerial access categories supported by the cell.

7. The apparatus of claim 6, wherein
the aerial access category of the apparatus being within the set of aerial access categories supported by the cell is based at least in part on a mapping of a mission status of the apparatus to the aerial access category of the apparatus.

8. A network node, comprising:
one or more processors;
a transceiver;
one or more memories coupled with the one or more processors; and
instructions stored in the one or more memories and executable by the one or more processors to cause the network node to:
transmit, via the transceiver, a signal or a channel comprising a synchronization signal block via a raster frequency reserved for cells supporting communications exclusively with aerial UEs, the communications associated with applications related to collision detection, collision avoidance, or both;
establish a connection with at least one aerial user equipment (UE) after transmitting the synchronization signal block via the raster frequency reserved for the cells supporting communications exclusively with aerial UEs; and
communicate with the at least one aerial UE via the established connection.

9. The network node of claim 8, wherein the instructions to transmit the signal or the channel are executable by the one or more processors to cause the network node to:
transmit, via the transceiver, the signal or the channel with a primary synchronization signal (PSS) sequence reserved for the cells supporting communications exclusively with aerial UEs or a secondary synchronization signal (SSS) sequence reserved for the cells supporting communications exclusively with aerial UEs.

10. The network node of claim 8, wherein the instructions to transmit the signal or the channel are executable by the one or more processors to cause the network node to:
transmit, via the transceiver, the signal or the channel with a master information block (MIB) reserved for the cells supporting communications exclusively with aerial UEs.

11. The network node of claim 8, wherein the instructions to transmit the signal or the channel are executable by the one or more processors to cause the network node to:
transmit, via the transceiver, the signal or the channel with a physical broadcast channel (PBCH) scrambling sequence reserved for the cells supporting communications exclusively with aerial UEs or a demodulation reference signal (DMRS) physical broadcast channel (PBCH) sequence reserved for the cells supporting communications exclusively with aerial UEs.

12. The network node of claim 8, wherein the instructions to transmit the signal or the channel are executable by the one or more processors to cause the network node to:
set a first barring flag for all UEs in the signal or the channel to a first value indicating that all UEs are barred from connecting to the network node; and
set a second barring flag for aerial UEs in the signal or the channel to a second value indicating that aerial UEs are allowed to connect to the network node.

13. The network node of claim 8, wherein the instructions are further executable by the one or more processors to cause the network node to:
transmit, via the transceiver in the signal or the channel, a set of aerial access categories supported by the network node, wherein an aerial access category of the at least one aerial UE is within the set of aerial access categories supported by the network node, and wherein the establishing the connection is further based at least in part on the aerial access category of the at least one aerial UE being within the set of aerial access categories supported by the network node.

14. An apparatus for wireless communication, comprising:
one or more processors;
one or more memories coupled with the one or more processors; and
instructions stored in the one or more memories and executable by the one or more processors to cause the apparatus to:
communicate via a first frequency band allocated to aerial UEs and non-aerial UEs;
receive system information comprising a sidelink frequency information list that comprises a list of frequency bands, including a second frequency band, dedicated to sidelink communications between aerial UEs, the sidelink communications being associated with applications related to collision detection, collision avoidance, or both; and
communicate with an aerial user equipment (UE) via the second frequency band.

15. The apparatus of claim 14, wherein the instructions to receive the system information comprising the sidelink frequency information list are executable by the one or more processors to cause the apparatus to:
receive a second list of frequency bands in the system information comprising a third list of frequency bands allocated to aerial UEs and non-aerial UEs and the list of frequency bands dedicated to aerial UEs, wherein the third list of frequency bands allocated to aerial UEs and non-aerial UEs comprises the first frequency band.

16. The apparatus of claim 15, wherein the instructions are further executable by the one or more processors to cause the apparatus to:
receive an indication with each frequency band in the second list of frequency bands indicating whether the frequency band is allocated to aerial UEs and non-aerial UEs or dedicated to aerial UEs.

17. The apparatus of claim 15, wherein the second list of frequency bands comprises an inter-frequency carrier list or a second sidelink frequency information list.

18. The apparatus of claim 14, wherein the instructions to receive the system information comprising the sidelink frequency information list are executable by the one or more processors to cause the apparatus to:
receive the system information comprising a second list of frequency bands allocated to sidelink communications between aerial UEs and non-aerial UEs.

19. The apparatus of claim 18, wherein the second list of frequency bands comprises a second sidelink frequency information list.

20. The apparatus of claim 14, wherein the instructions are further executable by the one or more processors to cause the apparatus to:
select a cell supporting communications via a third frequency band; and
establish a connection with the selected cell.

21. The apparatus of claim 20, wherein the system information further identifies the cell supporting communications via the third frequency band with which the apparatus is to establish the connection.

22. A network node, comprising:
one or more processors;
a transceiver;
one or more memories coupled with the one or more processors; and
instructions stored in the one or more memories and executable by the one or more processors to cause the network node to:
communicate with an aerial user equipment (UE) via a first frequency band allocated to aerial UEs and non-aerial UEs; and
transmit, via the transceiver, system information comprising a sidelink frequency information list that comprises a list of frequency bands dedicated to sidelink communications between aerial UEs, the sidelink communications being associated with applications related to collision detection, collision avoidance, or both, wherein the list of frequency bands includes a second frequency band.

23. The network node of claim 22, wherein the instructions to transmit the system information comprising the sidelink frequency information list are executable by the one or more processors to cause the network node to:
transmit, via the transceiver, a second list of frequency bands in the system information comprising a third list of frequency bands allocated to aerial UEs and non-aerial UEs and the list of frequency bands dedicated to aerial UEs, wherein the third list of frequency bands allocated to aerial UEs and non-aerial UEs comprises the first frequency band.

24. The network node of claim 23, wherein the instructions are further executable by the one or more processors to cause the network node to:
transmit, via the transceiver, an indication with each frequency band in the second list of frequency bands indicating whether the frequency band is allocated to aerial UEs and non-aerial UEs or dedicated to aerial UEs.

25. The network node of claim 23, wherein the second list of frequency bands comprises an inter-frequency carrier list or a second sidelink frequency information list.

26. The network node of claim 22, wherein the instructions to transmit the system information comprising the sidelink frequency information list are executable by the one or more processors to cause the network node to:
transmit, via the transceiver, the system information comprising a second list of frequency bands allocated to sidelink communications between aerial UEs and non-aerial UEs.

27. The network node of claim 26, wherein the second list of frequency bands comprises a second sidelink frequency information list.

28. The network node of claim 22, wherein the system information further identifies a cell with which the aerial UE is to establish a connection for communications via a third frequency band.

29. The apparatus of claim 1, wherein the apparatus is configured as an aerial UE and comprises a transceiver configured to receive the signal or the channel and establish the connection.

30. The apparatus of claim 14, wherein the apparatus is configured as a second aerial UE and comprises a transceiver configured to communicate via the first frequency band, receive the system information, and communicate via the second frequency band.

31. The apparatus of claim 14, wherein the system information comprises an indication of whether a frequency band in the list of frequency bands is allocated to both aerial and non-aerial UEs or to only aerial UEs.

* * * * *